United States Patent
Peng et al.

(10) Patent No.: US 11,797,372 B2
(45) Date of Patent: Oct. 24, 2023

(54) METHOD AND APPARATUS FOR GENERATING TIME SERIES DATA BASED ON MULTI-CONDITION CONSTRAINTS, AND MEDIUM

(71) Applicant: Shenzhen Institutes of Advanced Technology, Guangdong (CN)

(72) Inventors: Lei Peng, Guangdong (CN); Junnan Zhang, Guangdong (CN); Huiyun Li, Guangdong (CN)

(73) Assignee: Shenzhen Institutes of Advanced Technology, Guangdong (CN)

( * ) Notice: Subject to any disclaimer, the term of this patent is extended or adjusted under 35 U.S.C. 154(b) by 206 days.

(21) Appl. No.: 17/618,758

(22) PCT Filed: Mar. 26, 2020

(86) PCT No.: PCT/CN2020/081440
§ 371 (c)(1),
(2) Date: Dec. 13, 2021

(87) PCT Pub. No.: WO2021/189362
PCT Pub. Date: Sep. 30, 2021

(65) Prior Publication Data
US 2022/0253351 A1    Aug. 11, 2022

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01)

(58) Field of Classification Search
CPC .................. G06F 11/0793; G06F 11/0721
See application file for complete search history.

(56) References Cited

U.S. PATENT DOCUMENTS

| 2018/0365521 A1 | 12/2018 | Dai et al. |
| 2020/0065619 A1 | 2/2020 | Liu et al. |
| 2021/0089385 A1* | 3/2021 | Basuta ................ G06F 11/1048 |

FOREIGN PATENT DOCUMENTS

| CN | 103577694 A | | 2/2014 |
| CN | 105652300 A | * | 6/2016 |

(Continued)

OTHER PUBLICATIONS

CNIPA, First Office Action for Chinese Patent Application No. 202010227885.4, dated Mar. 31, 2023, 18 pages.
(Continued)

*Primary Examiner* — Katherine Lin
(74) *Attorney, Agent, or Firm* — IP Spring

(57) ABSTRACT

A method and an apparatus for generating time series data based on multi-condition constraints, and a medium are provided. The method include the following: a data repair request from a client is received, the data repair request including to-be-repaired data and condition information; normalization processing is performed on the to-be-repaired data to obtain normalized data, and tensor processing is performed on the condition information to obtain a feature label; a trained data repair model is called to perform repair processing on the normalized data according to the feature label to obtain first repaired data, the data repair model being obtained by training according to sample data, a first sample condition, real sample data and a second sample condition, and the sample data being noise data; and the first repaired data is sent to the client. By adopting embodiments of the application, rich features of the data can be acquired without a large amount of historical data or sample data with high matching degree as training basis, thus ensuring the accuracy and timing of the repaired data, and improving the repair efficiency and quality.

20 Claims, 13 Drawing Sheets

(56) References Cited

FOREIGN PATENT DOCUMENTS

| CN | 105652300 | A | | 6/2016 | | |
|---|---|---|---|---|---|---|
| CN | 108009632 | A | | 5/2018 | | |
| CN | 109670580 | A | | 4/2019 | | |
| CN | 110223509 | A | | 9/2019 | | |
| CN | 110580328 | A | * | 12/2019 | ............. | G06F 17/12 |
| CN | 110580328 | A | | 12/2019 | | |
| CN | 110825579 | A | | 2/2020 | | |
| WO | 2019100724 | A1 | | 5/2019 | | |

OTHER PUBLICATIONS

CNIPA, Notice of Allowance for Chinese Patent Application No. 202010227885.4, dated Jun. 19, 2023, 8 pages.
CNIPA, International Search Report for International Patent Application No. PCT/CN2020/081440, dated Dec. 30, 2020, 4 pages.

* cited by examiner

METHOD AND APPARATUS FOR
GENERATING TIME SERIES DATA BASED
ON MULTI-CONDITION CONSTRAINTS,
AND MEDIUM

CROSS-REFERENCE TO RELATED APPLICATIONS

This application is the U.S. National Stage filing under 35 U.S.C. § 371 of International Patent Application No. PCT/CN2020/081440, filed on Mar. 26, 2020.

TECHNICAL FIELD

The present application relates to the technical field of big data, particularly to a method and an apparatus for generating time series data based on multi-condition constraints, and a medium.

BACKGROUND

Time series data refers to data collected at different times, and such data is used to describe the change of a certain object or phenomenon with time in production and life. However, due to dense data points and poor anti-interference of such data, it is easy to cause data missing in the process of data collection, application or transmission. At present, the repair methods for the missing data mainly include the following two types: the first method is an interpolation method based on prior knowledge; and the second method is to obtain sample data that best matches the missing data, and to use the sample data to train a generative adversarial network to repair the missing data. However, the first method needs a lot of historical data as the basis, which is not suitable for repairing massive data. The second method is difficult to obtain sample data with high matching degree and is difficult to learn the effective features of the data, and the repaired data has poor accuracy and no timing.

SUMMARY

Disclosed herein are implementations of a method and an apparatus for generating time series data based on multi-condition constraints, and a medium, which may acquire rich features of to-be-repaired data without a large amount of historical data or sample data with high matching degree as training basis, thus ensuring the accuracy and timing of the repair data, and improving the repair efficiency and quality.

According to a first aspect, the embodiments of the application provide a method for generating time series data based on multi-condition constraints, which may include the following operations.

A data repair request is received from a client. Herein, the data repair request may include to-be-repaired data and condition information. The data repair request is used for requesting data repair to the to-be-repaired data according to the condition information, and the condition information is a feature condition matched with the to-be-repaired data.

Normalization processing is performed on the to-be-repaired data to obtain normalized data of the to-be-repaired data, and tensor processing is performed on the condition information to obtain a feature label of the condition information.

A trained data repair model is called to perform repair processing on the normalized data according to the feature label to obtain first repaired data. The data repair model is obtained by training the data repair model according to sample data, a first sample condition, real sample data and a second sample condition, and the sample data is noise data.

The first repaired data is sent to the client.

In the technical solution, the client sends the data repair request including the to-be-repaired data and the condition information to a server, so that the server performs normalization processing on the to-be-repaired data to obtain the normalized data, performs tensor processing on the condition information to obtain the feature label, the condition information being a feature condition matched with the to-be-repaired data, calls the trained data repair model to perform repair processing on the normalized data according to the feature label to obtain the first repaired data, and sends the first repaired data to the client. By this method, the rich features of the to-be-repaired data may be acquired based on the input of the condition information, so that the generated first repaired data is closer to the distribution features of real data, the accuracy and timing of the repair data are ensured, and the repair efficiency and quality are improved.

According to a second aspect, the embodiments of the application provide an apparatus for generating time series data based on multi-condition constraints, which may include a transceiver unit and a processing unit.

The transceiver unit is configured to receive a data repair request from a client. Herein, the data repair request may include to-be-repaired data and condition information. The data repair request is used for requesting data repair to the to-be-repaired data according to the condition information, and the condition information is a feature condition matched with the to-be-repaired data.

The processing unit is configured to perform normalization processing on the to-be-repaired data to obtain normalized data of the to-be-repaired data, perform tensor processing on the condition information to obtain a feature label of the condition information, and call a trained data repair model to perform repair processing on the normalized data according to the feature label to obtain first repaired data, the data repair model being obtained by training the data repair model according to sample data, a first sample condition, real sample data and a second sample condition, and the sample data being noise data.

The transceiver unit is further configured to send the first repaired data to the client.

According to a third aspect, the embodiments of the application provide an apparatus for generating time series data based on multi-condition constraints, which may include a processor, a memory and a communication interface. The processor, the memory and the communication interface are interconnected. Herein, the memory is configured to store a computer program, the computer program including a program instruction. The processor is configured to call the program instruction to execute the method as described in the first aspect. The implementation mode and beneficial effects of the processing device solving problems may be referred to the method and beneficial effects described in the first aspect above, and the repetition will not be elaborated here.

According to a fourth aspect, the embodiments of the application provide a computer-readable storage medium. The computer-readable storage medium is characterized by storing one or more first instructions, and the one or more first instructions are applicable to being loaded by a processor and executing the method as described in the first aspect.

In the embodiment of the application, a client sends a data repair request to a server, and the data repair request include to-be-repaired data and condition information. The server performs normalization processing on the to-be-repaired data to obtain normalized data, and performs tensor processing on the condition information to obtain a feature label, the condition information being a feature condition matched with the to-be-repaired data. Here, data repair based on the condition information may fully consider the diversity of the features of the to-be-repaired data so as to obtain more accurate repair data. A trained data repair model is called to perform repair processing on the normalized data according to the feature label to obtain first repaired data, and the first repaired data is sent to the client. Herein, the training method of the data repair model is that: iterative supervision training is performed on at least one set of input sample data, the first sample condition, the real sample data and the second sample condition through the multi-condition constrained Generative Adversarial Network (GAN). The sample data is noise data and the real sample data is real time series data. By the method of the embodiment, the missing time series data may be repaired. The training of the model may be implemented without a large amount of historical data or manually acquiring sample data with high matching degree with missing data as the training basis. Moreover, the rich features of the to-be-repaired data may be acquired through the introduction of multiple pieces of feature condition information. A Long Short-Term Memory (LSTM) network is used as a built-in network of a generator and a discriminator in the multi-condition constrained GAN, which ensures the accuracy and timing of the repair data and improves the repair efficiency and quality.

BRIEF DESCRIPTION OF THE DRAWINGS

In order to more clearly explain the technical solutions in the embodiments of this application, the drawings required in the descriptions of the embodiments will be briefly introduced below. It is apparent that the drawings in the following descriptions are only some embodiments of this application. Those of ordinary skill in the art may also obtain other drawings in accordance with these drawings without paying creative labor.

DETAILED DESCRIPTION

Figure 1:
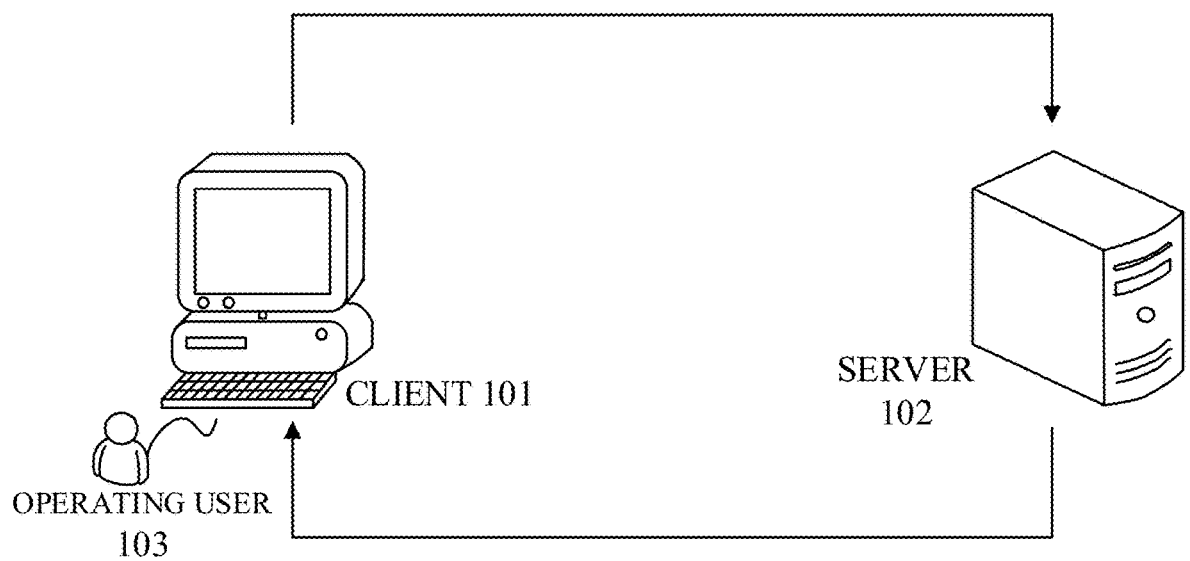
FIG. 1 is an architecture diagram of a system for generating time series data based on multi-condition constraints according to an embodiment of the application.

In order to make the objectives, technical solutions, and advantages of the present application clearer, the technical solutions of the embodiments of the present application are described below in detail with reference to the accompanying drawings. It is apparent that the described embodiments are only a part of the embodiments of the application but not all. All other embodiments obtained by those of ordinary skill in the art based on the embodiments in the application without creative work shall fall within the scope of protection of the application.

The specification and claims of the application and terms "first", "second" and "third", etc. in the accompanying drawings are used for distinguishing different objects rather than describing a specific sequence. In addition, terms "include" and any transformations thereof are intended to cover nonexclusive inclusions. For example, a process, method, system, product or apparatus including a series of steps or modules is not limited to the steps or modules which have been listed but optionally further includes steps or modules which are not listed or optionally further includes other steps or modules intrinsic to the process, the method, the product or the apparatus.

Time series data is a kind of one-dimensional data with time information collected at different times, such as traffic monitoring data and parking situation data of a parking lot. Such data is used to describe the change of a certain object or phenomenon with time in production and life. However, due to the dense data points and poor anti-interference of such data, it is easy to cause data missing in the process of data collection, application or transmission, which has a great impact on production and life. At present, the repair methods for missing data mainly include the following two types: the first method is an interpolation method based on prior knowledge, which needs a large amount of historical data as the basis, cannot repair more missing data, and is not suitable for repairing massive data. The other method needs to acquire sample data that best matches the missing data, use the sample data to train a GAN to obtain generated data, and fill the generated data into the missing data. The GAN may include: Deep Convolution Generative Adversarial Networks (DCGAN). However, this method is difficult to acquire sample data with high matching degree, and the generated data is disordered. For example, when parking lot data for one week is generated, it is impossible to determine which day the generated data is. At the same time, it is necessary to extract the features of a sample when training is performed by use of the GAN. Due to the diversity of the sample features, it is impossible to learn all the features from one sample, thus affecting the accuracy of data repair.

In order to solve the above problems, the embodiment of the application provides a method for generating time series data based on multi-condition constraints. The method for generating the time series data repairs massive data based on Multi-condition Generative Adversarial Networks (MC-GAN). The MCGAN includes a generator network and a discriminator network. Through a data repair model constructed by the MCGAN, data repair may be performed on the to-be-repaired data based on the to-be-repaired data and the condition information corresponding to the to-be-repaired data to obtain first repaired data. Herein, the condition information is a feature condition of the to-be-repaired data, such as time, space and climate. According to the implementation mode, abundant sample features can be acquired without a large amount of historical data or specific sample data as the basis, so that the data repair model can generate repair data closer to real data, thus ensuring the accuracy and timing of massive repair data and improving the quality of data repair.

Optionally, the implementation mode may be applied to a parking lot data repair scenario. Specifically, the missing parking lot data may be acquired as the to-be-repaired data, and the condition information affecting the distribution of parking spaces, such as time, space, climate and other information, may be acquired. The to-be-repaired data is subjected to normalization processing to obtain normalization processing data, and the condition information is subjected to tensor processing to obtain a feature label. Then, the data repair model based on the MCGAN may be called, and the normalized data is subjected to data repair according to the feature label to obtain the first repaired data. The first repaired data may be understood as the data conforming to the real situation of the parking lot.

The method for generating the time series data based on the multi-condition constraints mentioned above may be applied to the system for generating the time series data based on the multi-condition constraints as shown in FIG. 1. The system for generating the time series data based on the multi-condition constraints may include a client 101 and a server 102. The form and number of the clients 101 are exemplified, and do not constitute a limitation on the embodiment of the application. For example, two clients 101 may be included.

The client 101 may be a client that sends a data repair request to the server 102, or a client that provides sample data, a first sample condition, real sample data and a second sample condition to the server 102 during data repair model training. The client may be any of the following: a terminal, an independent application program, an Application Programming Interface (API) or a Software Development Kit (SDK). The terminal may include, but is not limited to, smart phones (such as Android phones and IOS phones), tablet computers, portable personal computers, Mobile Internet Devices (MID) and other devices, which is not limited in the embodiment of the application. The server 102 may include, but is not limited to, a cluster server.

In the embodiment of the application, the client 101 sends the data repair request to the server 102, and the server 102 acquires the first repaired data of the to-be-repaired data according to the to-be-repaired data and the condition information included in the data repair request. Specifically, the to-be-repaired data is subjected to normalization processing to obtain normalized data, and the condition information is subjected to tensor processing to obtain a feature label. The normalized data is subjected to repair processing by the pre-trained data repair model in combination with the feature label to obtain the first repaired data, and the first repaired data is sent to the client 101, so that an operating user 103 of the client 101 may analyze the change of a certain object or phenomenon with time according to the first repaired data.

Figure 2:
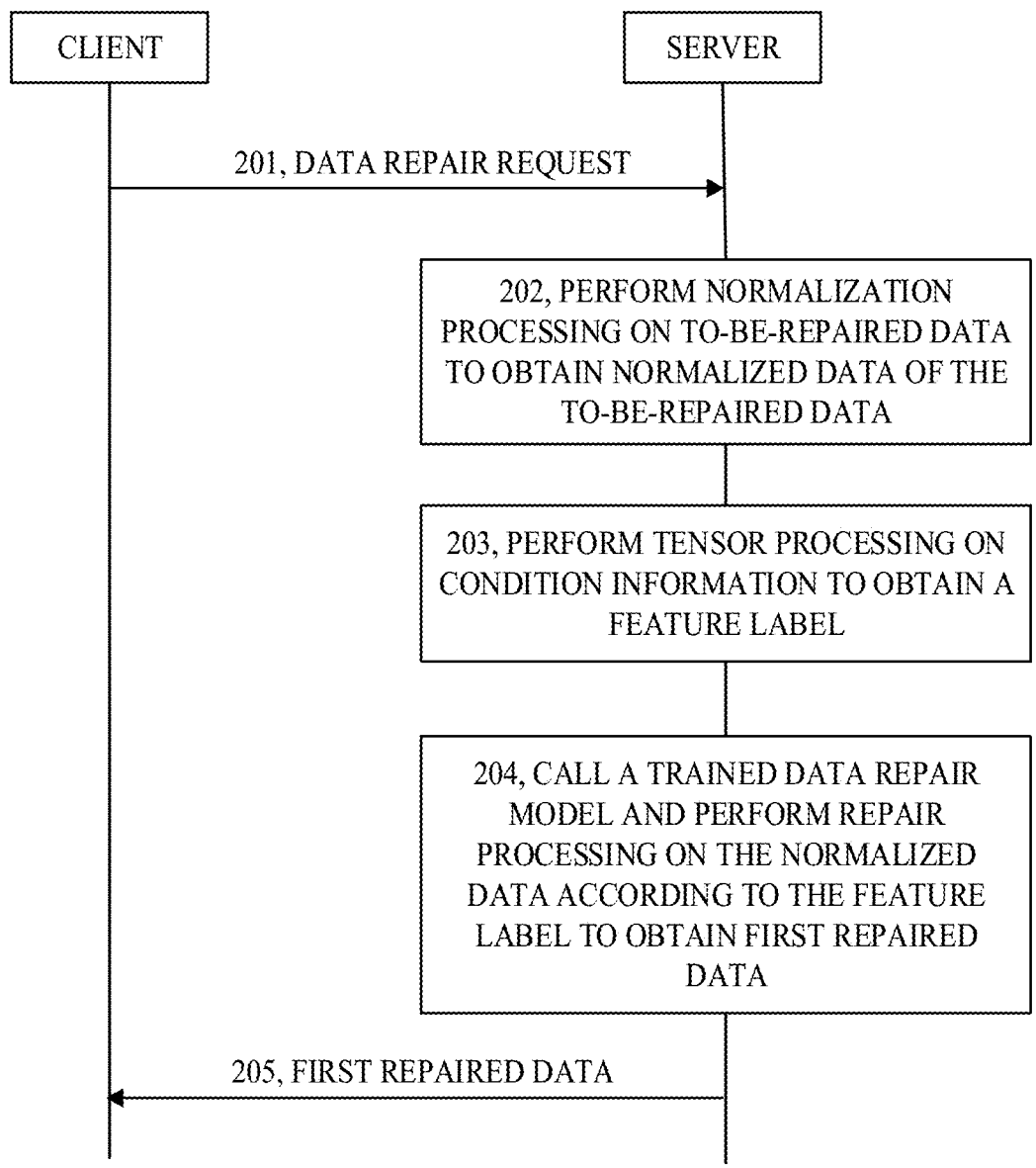
FIG. 2 is a flowchart of a method for generating time series data based on multi-condition constraints according to an embodiment of the application.

Referring to FIG. 2, FIG. 2 is a flowchart of a method for generating time series data based on multi-condition constraints according to an embodiment of the application. As shown in FIG. 2, the method for generating the time series data may include the following 201-205.

At 201, a client 101 sends a data repair request to a server 102.

Specifically, the client 101 sends the data repair request to the server 102. Correspondingly, the server 102 receives the data repair request from the client 101. The data repair request includes to-be-repaired data and condition information, and the data repair request is used for requesting data repair to the to-be-repaired data according to the condition information. Herein, the to-be-repaired data is data with a missing condition existing, and specifically, may be time series data with the missing condition existing. The condition information is a feature condition that matches the to-be-repaired data. For example, if the to-be-repaired data is parking lot data, the condition information may include time, space, climate, and the like.

At 202, the server 102 performs normalization processing on the to-be-repaired data to obtain the normalized data of the to-be-repaired data.

Specifically, the server 102 performs normalization processing on the to-be-repaired data to obtain the normalized data of the to-be-repaired data. The to-be-processed data is time series data, for example, time series data M, and then the to-be-repaired data may be expressed as $$M=\{m_{t_1}, m_{t_2} \ldots m_{t_k} | k=1,2 \ldots l\}$$

where $m_{t_k}$ represents the data value of the to-be-repaired data corresponding to $t_k$ moment, and l is the length of the to-be-repaired data.

Then, the normalization processing method may be as follows: the maximum value Mmax=max(M) of a sequence is acquired, and each data in the above-mentioned to-be-repaired data is subjected to quotient with the maximum value respectively to obtain the normalized data. The normalized data may be expressed as $$\{r_{t_1}, r_{t_2} \ldots r_{t_l}\} = \frac{M}{M_{max}} = \left\{\frac{m_{t_1}}{M_{max}}, \frac{m_{t_2}}{M_{max}} \ldots \frac{m_{t_l}}{M_{max}}\right\}$$

where $r_{t_l}$ represents the data value of the normalized data corresponding to $t_l$ moment.

Optionally, the to-be-repaired data may be subjected to data cleaning before the to-be-repaired data is subjected to normalization processing. This optional implementation mode facilitates easier convergence of the normalized data in the data repair model.

At 203, the server 102 performs tensor processing on the condition information to obtain a feature label of the condition information.

Specifically, the server 102 performs tensor processing on the condition information to obtain the feature label of the condition information. The condition information is a feature condition matched with the above to-be-repaired data. Herein, the condition information may include, but not limited to, static condition information, for example, the static condition information being the distribution of buildings around the parking lot when the to-be-repaired data is parking lot data; dynamic continuity condition information, such as a time series label; and discrete condition information, for example, if there are seven days in a week, seven days being different discrete characteristics, or social events such as weather and holidays. When input to the server 102, it is necessary to perform tensor processing on the acquired condition information to obtain the feature label of the condition information.

Furthermore, for the tensor method of the static condition information, taking buildings as an example, different buildings have different static condition information, so it is necessary to acquire buildings with different distributions, that is, multiple influence factors $l_1 \ldots l_n$ of the static condition information, where n is the number of the influence factors. A normalization method may be adopted for tensor processing of the static condition information, and the obtained feature label may be expressed as follows:

$$C = \left( \frac{|l_1|}{\sum_{i=1}^{n}|l_i|}, \frac{|l_2|}{\sum_{i=1}^{n}|l_i|} \cdots \frac{|l_n|}{\sum_{i=1}^{n}|l_i|} \right)$$

Furthermore, for the tensor method of the dynamic continuity condition information, the normalization processing method may be adopted to obtain a condition sequence of the dynamic continuity condition information. The condition sequence may be understood as condition labels arranged in time series, and the condition sequence may be expressed as:

$$L = \{l_{t_1}, l_{t_2} \ldots l_{t_k} | k=1,2 \ldots l\}$$

where $l_{t_k}$ represents the condition label value at tk moment.

Then, the normalization processing method may be that the maximum value Lmax=max(L) of a condition sequence is acquired, and each data in the above-mentioned to-be-repaired data is subjected to quotient with the maximum value respectively to obtain the feature label. The feature label may be expressed as:

$$C = \{l_{t_1}, l_{t_2} \ldots l_{t_l}\} = \frac{L}{L_{max}} = \left\{ \frac{l_{t_1}}{L_{max}}, \frac{l_{t_2}}{L_{max}} \cdots \frac{l_{t_l}}{L_{max}} \right\}$$

Furthermore, for the tensor processing of the discrete condition information, a onehot encoding mode may be used, and the feature label may be expressed as:

$$C = onehot(n)$$

where n is the number of possible occurrences of events. For example, if the number of possible occurrences of events is 2, the representation methods of events 1 and 2 may be {1,0} and {0,1} respectively.

At 204, the server 102 calls the trained data repair model, and performs repair processing on the normalized data according to the feature label to obtain the first repaired data.

Specifically, the server 102 calls the trained data repair model, and performs repair processing on the normalized data according to the feature label to obtain the first repaired data. Herein, the data repair model is obtained by training the data repair model according to the sample data, the first sample condition, the real sample data and the second sample condition, and the sample data is noise data. The data repair model is a model constructed by repeated iterative training of a generator network and a discriminator network using the sample data, the first sample condition, the real sample data and the second sample condition.

Furthermore, if the to-be-repaired data includes a time point sequence, the normalized data is subjected to repair processing according to the feature label to obtain the first repaired data, which may be that each data in the normalized data is sorted according to the time point sequence, and the sorted normalized data is subjected to data repair processing according to the feature label to obtain the first repaired data. The time point sequence is a sequence composed of generation time points of each data in the to-be-repaired data, that is, $\{t_1, t_2 \ldots t_l\}$ in the above-mentioned to-be-processed data, and the normalized data obtained by performing normalization processing on the to-be-repaired data also carries the time point sequence, that is, $\{t_1, t_2 \ldots t_l\}$ in the above-mentioned normalized data. In the case that each data in the normalized data is sorted according to the time point, the sorted normalized data are input to the generator network of the data repair model. The built-in network of the generator is an LSTM network. The adoption of the LSTM network may improve the processing ability of the data repair model on the time series. Specifically, each data in the sorted normalized data is input to each corresponding cell interface of the LSTM network according to the time sequence. Herein, the cell interface data of the LSTM network has the same length as the normalized data. The feature labels are respectively input to each cell interface, so that the generator network may perform data repair on the normalized data according to the feature label to obtain the first repaired data.

By executing the implementation mode, more accurate repair data may be obtained based on rich features of the to-be-repaired data. The adoption of the LSTM network may ensure the timing of generated data and improve the quality of data repair.

At 205, the server 102 sends the first repaired data to the client 101.

Specifically, the server 102 sends the first repaired data to the client 101. Accordingly, the client 101 receives the first repaired data, so that the operating user 103 of the client 101 may analyze the change of a certain object or phenomenon with time according to the first repaired data. The first repaired data is the repaired data close to the real situation.

It can be seen that by implementing the method described in FIG. 2, after the client 101 sends the data repair request, the server 102 performs normalization processing on the to-be-repaired data in the data repair request to obtain the normalized data, and performs tensor processing on the condition information in the data repair request to obtain the feature label, the condition information being a feature condition that matches the to-be-repaired data. Here, data repair based on the condition information may fully consider the diversity of the features of the to-be-repaired data so as to obtain more accurate repair data. The trained data repair model is called, the normalized data is subjected to repair processing according to the feature label to obtain the first repaired data, and the first repaired data is sent to the client 101. By executing the method in the embodiment, the rich features of the to-be-repaired data can be acquired without a large amount of historical data or sample data with high matching degree as training basis, thus ensuring the accuracy and timing of the repaired data, and improving the repair efficiency and quality.

Figure 3:
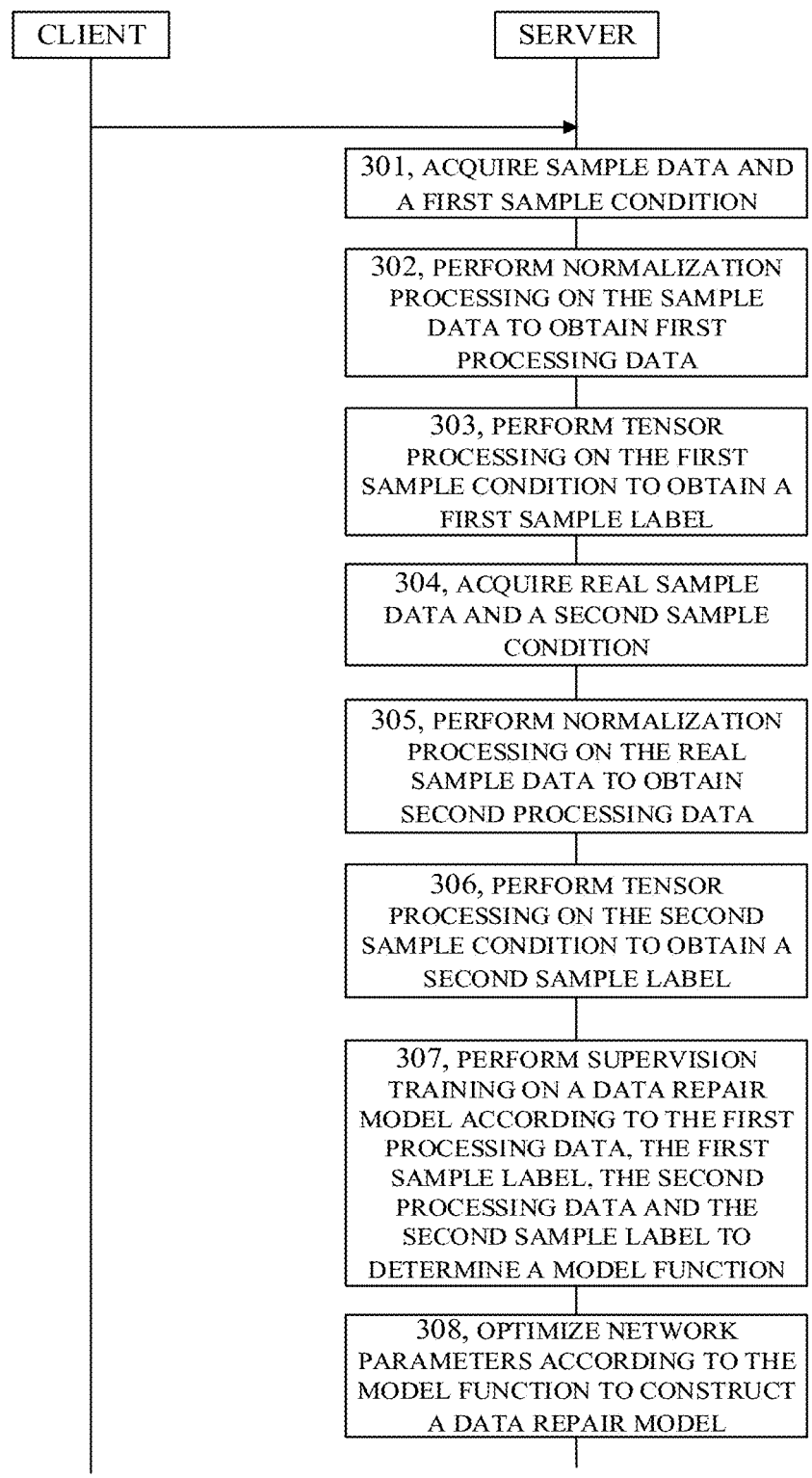
FIG. 3 is a flowchart of another method for generating time series data based on multi-condition constraints according to an embodiment of the application.

Referring to FIG. 3, FIG. 3 is a flowchart of a method for generating time series data based on multi-condition constraints according to an embodiment of the application. As shown in FIG. 3, the method for generating the time series data may include the following 301-308.

At 301, the server 102 acquires sample data and a first sample condition.

Specifically, the server 102 may acquire the sample data and the first sample condition matched with the sample data from the client 101 or other data platforms. The related descriptions of the first sample condition may be referred to the related descriptions of the condition information in S201, which will not be elaborated here. The sample data may be noise sample sequence data sampled in a noise space, and the sample data may be expressed as:

$$Z=\{z^{(1)},z^{(2)},z^{(3)}\ldots z^{(n)}\}$$

At 302, the server 102 performs normalization processing on the sample data to obtain first processing data.

Specifically, in the case that the server 102 acquires the sample data, the sample data is subjected to normalization processing to obtain the first processing data of the sample data. Here, the method of normalization processing may be referred to related descriptions of normalization processing of the to-be-repaired data in S202, which will not be elaborated here.

At 303, the server 102 performs tensor processing on the first sample condition to obtain a first sample label.

Specifically, the server 102 performs tensor processing on the first sample condition to obtain the first sample label. Here, the method of tensor processing may be referred to related descriptions of tensor processing of the condition information in S203, which will not be elaborated here.

Furthermore, after the first processing data and the first sample label are acquired, a sample supervision data set may be constructed according to the first processing data and the first sample label corresponding to the first processing data, and the sample supervision data set is used to be input to the MCGAN for network training to construct a data repair model. The first sample label $Y_p$ may be expressed as:

$$Y_p=\{y_{p,t_1},y_{p,t_2}\ldots y_{p,t_k}|k=1,2\ldots l;p=1,2\ldots n\}$$

where n is the number of the first sample labels. The above-mentioned supervision data set may be expressed as:

$$S=\{(r_{t_k},y_{1,t_k},y_{2,t_k},y_{3,t_k}\ldots y_{n,t_k})\}_{k=1,2\ldots l}$$

At 304, the server 102 acquires real sample data and a second sample condition.

Specifically, the server 102 may acquire the real sample data and the second sample condition matched with the real sample data from the client 101 or other data platforms. The related descriptions of the second sample condition may be referred to the related descriptions of the condition information in S201, which is not elaborated here. Optionally, the second sample condition may be the same feature condition as the first sample condition. The real sample data is the missing real data, for example, the missing real parking lot data, and the real sample data X may be expressed as:

$$X=\{x^{(1)},x^{(2)},x^{(3)}\ldots x^{(n)}\}$$

where n is the number of the real sample data.

At 305, the server 102 performs normalization processing on the real sample data to obtain second processing data.

Specifically, the server 102 performs normalization processing on the real sample data to obtain the second processing data of the real sample data. Here, the method of normalization processing may be referred to related descriptions of normalization processing of the to-be-repaired data in S202, which will not be elaborated here.

At 306, the server 102 performs tensor processing on the second sample condition to obtain a second sample label.

Specifically, the server 102 performs tensor processing on the first sample condition to obtain the first sample label. Here, the method of tensor processing may be referred to related descriptions of tensor processing of the condition information in S203, which will not be elaborated here.

Furthermore, a real supervision data set may be constructed according to the second processing data and the second sample label corresponding to the second processing data, and the related descriptions of the method for constructing the real supervision data set may be referred to the composition of the sample supervision data set in S303, which will not be elaborated here.

At 307, the server 102 performs supervision training on the data repair model according to the first processing data, the first sample label, the second processing data and the second sample label to determine a model function.

Specifically, the server 102 performs supervision training on the data repair model according to the first sample data, the first sample label, the second processing data and the second sample label to determine the model function, so that network parameters may be further optimized and the data repair model may be constructed according to the model function, that is, S308 is executed.

Figure 4:
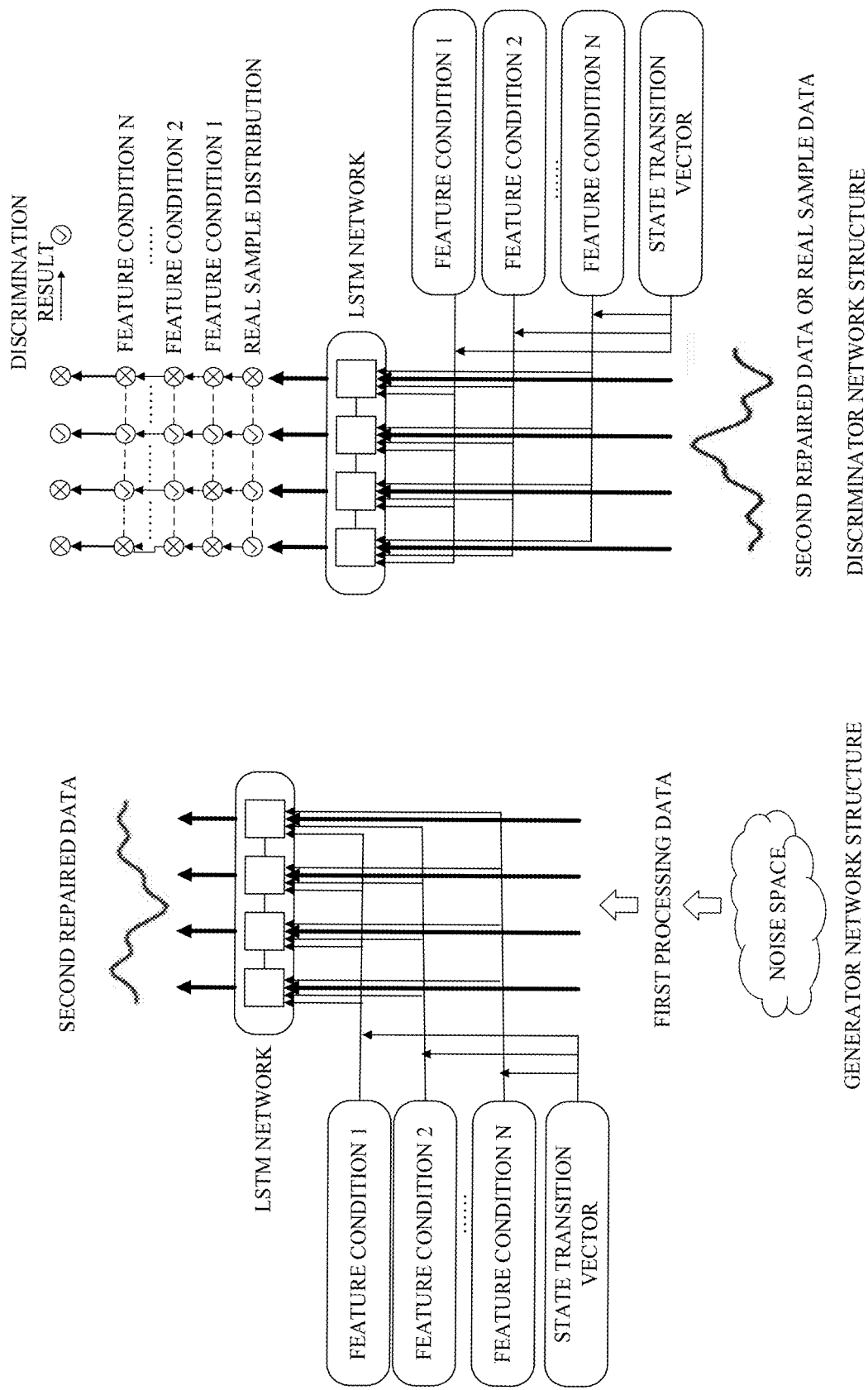
FIG. 4 is a frame diagram of a multi-condition GAN according to an embodiment of the application.

Furthermore, the network involved in training the data repair model is the MCGAN network, which mainly includes a generator and a discriminator. The frame diagram of the network may be referred to FIG. 4. The process of performing supervision training using the MCGAN network is that: the sample data is obtained by sampling from the noise space, the sample data Z being subjected to normalization processing to obtain the first processing data, the first sample condition matching the sample data Z being acquired, and the first sample condition being subjected to tensor processing to obtain the first sample label. The first sample label may include a plurality of tensor feature conditions C. The first processing data is input to each data cell interface of the built-in LSTM network of the generator, and each tensor feature condition C of the first sample label is input to each cell interface through a condition channel. Each condition channel may transmit one tensor feature condition C, and then the input data of the above-mentioned generator may be expressed as $\{Z, C_1, C_2 \ldots C_n\}$. Furthermore, second repaired data may be obtained. Here, the related descriptions of the LSTM network may be referred to the corresponding descriptions in S204, which will not be elaborated here. In the case that the second repaired data is obtained, the second repaired data F and the corresponding first sample label may be input to the discriminator for discrimination processing, and a first discrimination result may be obtained. Also, the real sample data R subjected to normalization processing and the second sample label, subjected to tensor processing, corresponding to the real sample data R are input to the discriminator. The second sample label includes a plurality of tensor feature conditions C. At this time, the input data of the discriminator may be expressed as $\{(F \text{ or } R), C_1, C_2 \ldots C_n\}$, and a second discrimination result is output. Herein, the built-in network of the discriminator is the LSTM network. The discriminator is the same as the generator and includes a condition channel and a data channel. Optionally, a state transition vector may be configured in both the generator and the discriminator, and the state transition vector may control the opening or closing of the above-mentioned condition channel, so as to adjust the feature condition required for training.

Furthermore, the above-mentioned first sample condition includes n feature conditions, and n is a positive integer. Before the sample data and the first sample condition are acquired, the client 101 may also send a condition instruction to the server 102. The condition instruction is used to instruct to acquire x feature conditions from the n feature conditions, and x is a non-negative integer less than or equal to n. The server 102 may acquire x feature conditions from the first sample condition information including the n feature conditions according to the condition instruction. Specifically, the following three situations may be included: when the client 101 does not send the condition instruction, the condition channels of the generator and the discriminator are all in an opening state. If the instruction sent by the client 101 is received, the generator and the discriminator close the specified condition channels when the condition instruction indicates to close some condition channels. When the condition instruction indicates to close all, the generator and the discriminator close all the condition channels accordingly. At this time, the process of generating the repaired data does not need to consider the feature conditions. Optionally, the condition instruction may include a state transition vector, and the state transition vector may be embedded in the condition channels to control switching of each condition channel. The input data G' of the generator LSTM network after adding the state transition vector may be expressed as:

$$G'=\{Z, S_1 * C_1, S_2 * C_2 \ldots S_n * C_n\}$$

where S=1 represents switch-on, that is, the condition channel is in an opening state, and S=1 represents switch-off, that is, the condition channel is in a closing state. Furthermore, the input data D' of the discriminator LSTM network after adding the state transition vector may be expressed as:

$$D'=\{(F \text{ or } R), S_1 * C_1, S_2 * C_2 \ldots S_n * C_n\}$$

Through the implementation mode, the application range of the network may be improved, and the network structure may be adaptively adjusted for different feature conditions to acquire the repaired data generated under different feature conditions.

Furthermore, the model function may include a generative loss function, a discrimination loss function and an objective function. The process of determining the model function may be that: the first processing data is subjected to repair processing according to the first sample label to obtain the second repaired data, and the second repaired data and the first sample label are subjected to discrimination processing to obtain the first discrimination result; the second processing data and the second sample label are subjected to discrimination processing to obtain the second discrimination result; the discrimination loss function is determined according to the first discrimination result and the second discrimination result; the generative loss function is determined according to the first discrimination result; and the discrimination loss function and the generative loss function are optimized to determine the objective function.

Specifically, the generator performs repair processing on the first processing data according to the first sample label $Y_p$ to obtain the second repaired data $G(Z|Y_p)$ carrying the first sample label $Y_p$. Herein, the first processing data is the sample data Z subjected to normalization processing. In the case that the second repaired data $G(Z|Y_p)$ carrying the first sample label $Y_p$ is obtained, the second repaired data $G(Z|Y_p)$ carrying the first sample label $Y_p$ is input to the discriminator to cause the discriminator to discriminate the second repaired data and obtain the first discrimination result $D(G(Z|Y_p))$. On the one hand, the discriminator needs to judge whether the generated data meets the real sample distribution; on the other hand, it also needs to judge whether the generated data meets the corresponding feature conditions. If the discrimination result is yes, it means that the generated second repaired data is data that meets the real sample features. If the judgment result is no, network parameters are needed, and iterative training is continued to generate repaired data that meets the real sample features, so that the outputs of the discriminator are as true as possible. A diagnosis network J of the discriminator may be expressed as:

$$J = J_{real\text{-}sample\text{-}distribustion}(D') \& J_{condition\text{-}1}(D') \& J_{condition\text{-}1}(D') \& \ldots J_{condition\text{-}n}(D')$$

where $J_{real\text{-}sample\text{-}distribustion}(D')$ represents the judgment result of whether the generated data meets the real sample distribution, $J_{condition\text{-}n}(D')$ representing the judgment result of whether the generated data meets the corresponding feature conditions, and D' representing the judgment result output by the discriminator, $D'=\{d_1, d_2 \ldots d_n\}$.

Based on the diagnosis network of the discriminator, furthermore, the second processing data and the second sample label $Y_p$ may be subjected to discrimination processing to obtain a second discrimination result $D(X|Y_p)$. The second processing data is the real sample data X subjected to normalization processing. In the case that the first discrimination result and the second discrimination result are acquired, the discrimination loss function may be determined according to the first discrimination result and the second discrimination result. The discrimination loss function is the loss function of the discriminator, and the loss function of the discriminator may be expressed as:

$$\text{Loss} = -(\log D(x|_y^r) + \log(1 - D(G(z|_y^r)))$$

According to the first discrimination result, the generative loss function may be determined. The generative loss function is the loss function of the generator, and the loss function of the generator may be expressed as:

$$\text{Loss} = \log(1 - D(G(z|_y^r)))$$

In the case that the above-mentioned discrimination loss function and the generative loss function are acquired, the discrimination loss function and the generative loss function are optimized to determine the objective function. The optimization objective of the discriminator is to cause the objective function to get the maximum value through optimization. In the implementation mode, if the loss function of the discriminator is in a negative form, the objective is to get a minimum value of the discrimination loss function through optimization. The optimization objective of the generator is to cause the objective function to get the minimum value through optimization. The objective function may be expressed as:

$$\min_G \max_D V\left(D, G, \begin{array}{c}r\\y\end{array}\right) = E_{x \sim P_{data}} E^r_{y \sim P_{cond} \in y_1 * \ldots y_n} [\log D(x|_y^r)] + E_{z \sim P_z(z)}$$
$$E^r_{y \sim P_{cond} \in y_1 * \ldots y_n} [\log(1 - D(G(z|_y^r)))]$$

where $P_{cond}$ is the joint distribution probability of each feature condition included in the sample condition, and y1* . . . yn is a condition probability space $y_{cond}$ composed of n feature conditions y. The joint distribution probability complying with the condition probability space is:

$$P_{cond}: y_1 * \ldots y_n$$

If the input data is the real sample data, the joint distribution probability $P_{cond}$, noise space pz(z) and probability space $y_{cond}$ are all quantitative.

At 308, the server 102 optimizes the network parameters according to the model function to construct a data repair model.

Specifically, in the process of determining the above-mentioned generative loss function, the discrimination loss function and the objective function, the server 102 optimizes the network parameters of the generator network and the discriminator network according to the loss function after repeated iterative training, and constructs the data repair model according to the optimized network parameters. The optimization process may be that: according to the result of the discrimination loss function, an Adaptive Moment Estimation (Adam) optimization algorithm is used to optimize the discriminator. In the case that the discriminator is optimized, the generator is optimized according to the optimized discriminator. According to the result of the generative loss function, the Adam algorithm is used to optimize the generator. Through continuous iterative adversarial training of the generator and the discriminator, the loss function is caused to converge. Here, the process and subjective of convergence of the loss function may be referred to S307, which will not be elaborated here. Furthermore, after the convergence of the loss function and the optimization of the network parameters are completed, the data repair model is constructed according to the optimized network parameters.

Optionally, before the network parameters are optimized, the second repaired data and the second processing data may also be subjected to average cosine similarity calculation to obtain a similarity result. According to the similarity result, the network parameters of the data repair model are optimized. The second processing data is real data matched with the second repaired data. Specifically, the generated data sequence of the second repaired data may be expressed as:

$$R_m = \{r_{m,t_1}, r_{m,t_2} \ldots r_{m,t_l}\}$$

where m is the number of iterations of the generated data sequence, and l is the length of the data sequence.

The data sequence of the second processing data may be expressed as:

$$R_{groudtruth} = \{r'_{t_1}, r'_{t_2} \ldots r'_{t_k}\}$$

where k is the length of the second processing data, and the second processing data corresponds to original real sample data of the second repaired data. The second processing data and the second repaired data are subjected to average cosine similarity calculation, and the calculation method of the similarity may be expressed as:

$$S = \frac{1}{m}\sum_{j=0}^{m} \frac{\sum_{i=1}^{k} r_{j,t_i} * r'_{t_i}}{\sqrt{\sum_{i=1}^{k}(r_{j,t_i})^2} * \sqrt{\sum_{i=1}^{k}(r'_{t_i})^2}}$$

Furthermore, the average cosine similarity of this training may be calculated in each round of iterative training, and the network parameters may be optimized according to an average cosine similarity result, so that the generator may generate repaired data closer to the real sample distribution.

Figure 5:
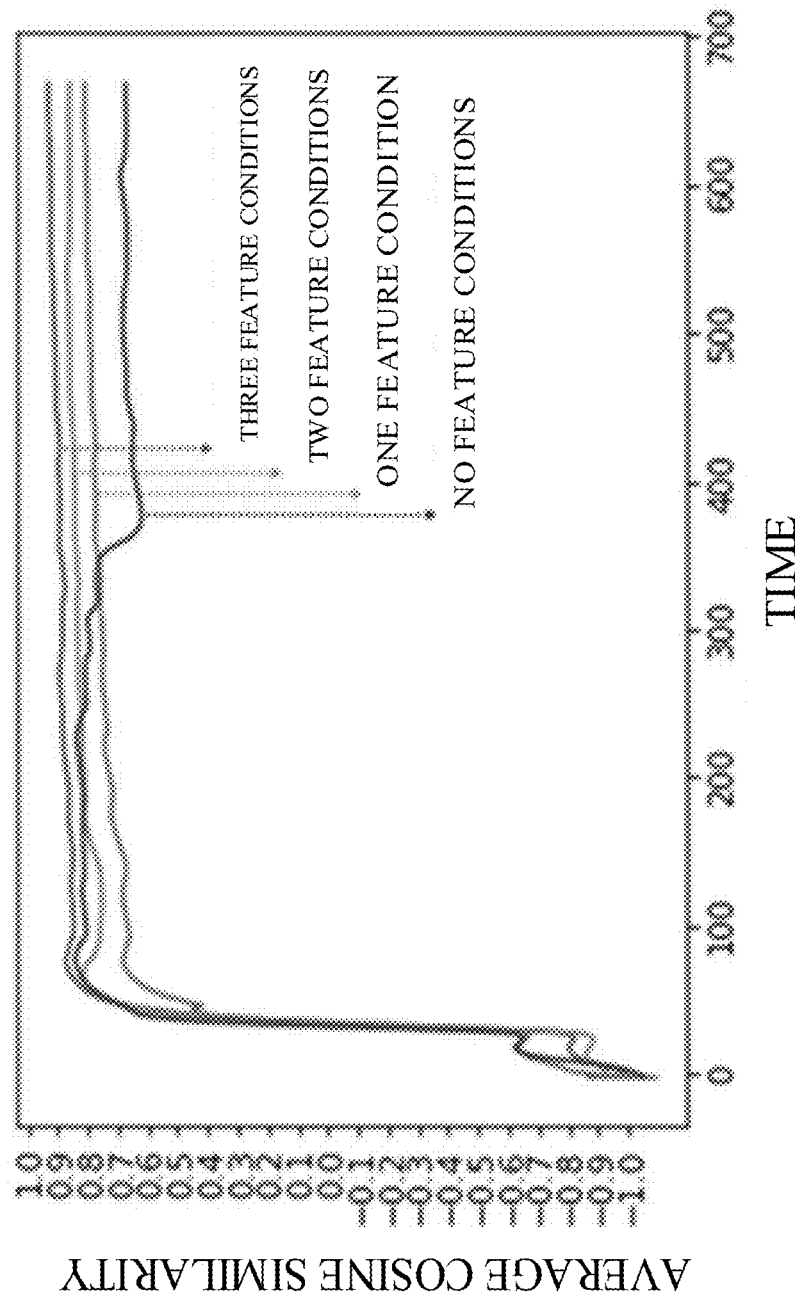
FIG. 5 is a schematic diagram of an average cosine similarity calculation result according to an embodiment of the application.

For example, the network parameter optimization process based on the average cosine similarity may be performed according to the switching modes of different condition channels. In the implementation mode, taking three feature conditions as an example, the switching modes of four different condition channels may be: fully closed (no feature conditions), partially closed (one feature condition and two feature conditions) and fully open (three feature conditions). Here, the regulation of the switching modes of the condition channels may be referred to the related descriptions in S307, which will not be elaborated here. In different condition channel switching modes, the change of the cosine similarity result with the iterative training may be referred to FIG. 5. As shown in FIG. 5, when the condition channel is fully open, that is, when all feature conditions are considered, the generated repaired data has the highest similarity with the real sample data, and the generated repaired data is closer to the real sample distribution. Along with the optimization of the network parameters, the generated repaired data is closer to the real sample data.

By executing the implementation mode, the generation quality of the repaired data and the training situation of the network may be displayed more intuitively. The introduction of multi-condition information facilitates learning the rich features of the samples, so that the data repair model can generate repaired data closer to the real distribution, and improve the quality and efficiency of the generated data.

It can be seen that by implementing the method described in FIG. 3, in the case that the server 102 acquires the sample data and the corresponding first sample condition, it performs normalization processing on the sample data to obtain the first processing data, and performs tensor processing on the first sample condition to obtain the first sample label. In the case that the server 102 acquires the real sample data and the second sample condition, it performs normalization processing on the real sample data and performs tensor processing on the second sample condition to obtain the second processing data and the second sample label. The data repair model may be subjected to supervision training according to the first processing data, the first sample label, the second processing data and the second sample label. The model function including the generative loss function, the discrimination loss function and the objective function is determined. The network parameters are optimized according to the model function, and the data repair model is constructed according to the optimized network parameters. By executing the implementation mode, the data repair model may be obtained by performing supervision training according to the known time series sample data, without a large amount of historical data or manually acquiring sample data with high matching degree as the training basis, which solves the problems of high experimental cost and difficult sample acquisition. By introducing the feature conditions corresponding to the data, the rich features of the samples may be learned, so that the generated repaired data can be closer to the real sample distribution. LSTM is used as the built-in network of the generator and the discriminator, which ensures the timing of the generated repaired data and improves the efficiency and quality of the data repair process.

Figure 6:
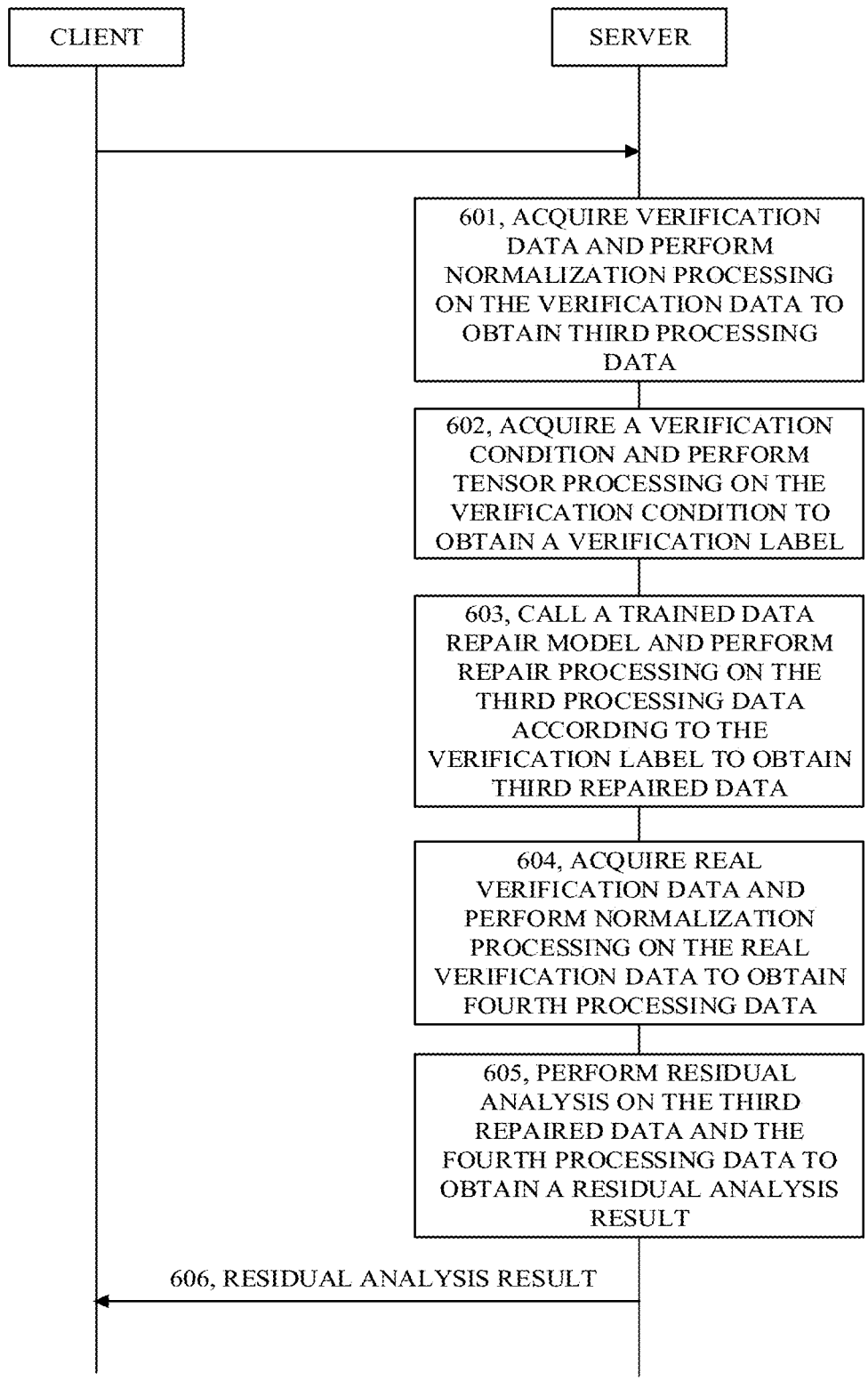
FIG. 6 is a flowchart of yet another method for generating time series data based on multi-condition constraints according to an embodiment of the application.

Referring to FIG. 6, FIG. 6 is a flowchart of a method for generating time series data based on multi-condition constraints according to an embodiment of the application. As shown in FIG. 6, the method for generating the time series data may include the following 601-606.

At 601, the server 102 acquires verification data and performs normalization processing on the verification data to obtain third processing data.

Specifically, the server 102 may acquire the verification data from the client 101 or other data platforms, and the verification data may be understood as a type of sample data.

Optionally, the sample data may include training data, verification data and test data. The related process of performing normalization processing on the verification data to obtain the third processing data may be referred to related descriptions of performing normalization processing on the sample data in S302, which will not be elaborated here.

At 602, the server 102 acquires a verification condition and performs tensor processing on the verification condition to obtain a verification label.

Specifically, the server 102 acquires the verification condition matched with the verification data in S401 and performs tensor processing on the verification condition to obtain the verification label. The related descriptions of the verification condition and the verification label acquisition method herein may be referred to the related descriptions of the first sample condition and the acquisition method thereof in S601 and S303, which will not be elaborated here.

At 603, the server 102 calls the trained data repair model, and performs repair processing on the third processing data according to the verification label to obtain third repaired data.

Specifically, the process that the server 102 calls the trained data repair model, and performs repair processing on the third processing data according to the verification label to obtain the third repaired data may be referred to the generation process of the first repaired data in S204, which is not elaborated here.

At 604, the server 102 acquires real verification data and performs normalization processing on the real verification data to obtain fourth processing data of the real verification data.

Specifically, the related descriptions of the server 102 acquiring the real verification data and performing normalization processing on the real verification data may be referred to the related descriptions of the acquisition and normalization processing method of the real sample data in S304 and S305, which will not be elaborated here. The fourth processing data is the real data matched with the third repaired data.

At 605, the server 102 performs residual analysis on the third repaired data and the fourth processing data to obtain a residual analysis result.

Specifically, the server 102 performs residual analysis on the third repaired data and the fourth processing data to obtain the residual analysis result. The residual analysis result may be a residual analysis result chart, and the generation quality of the third repaired data may be displayed more intuitively through the residual analysis result chart.

Figure 7A:
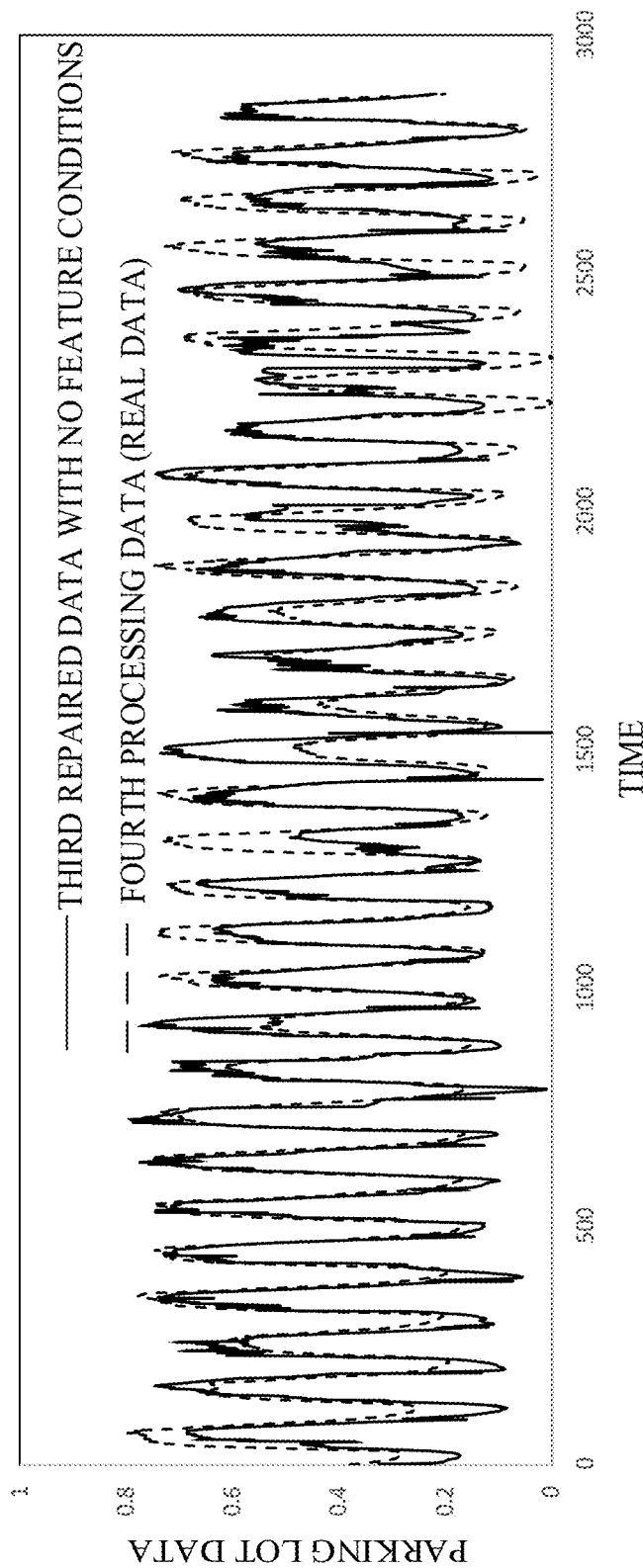
FIG. 7(a) is a comparison schematic diagram of condition-free constrained generated data with real data according to an embodiment of the application.
Figure 7B:
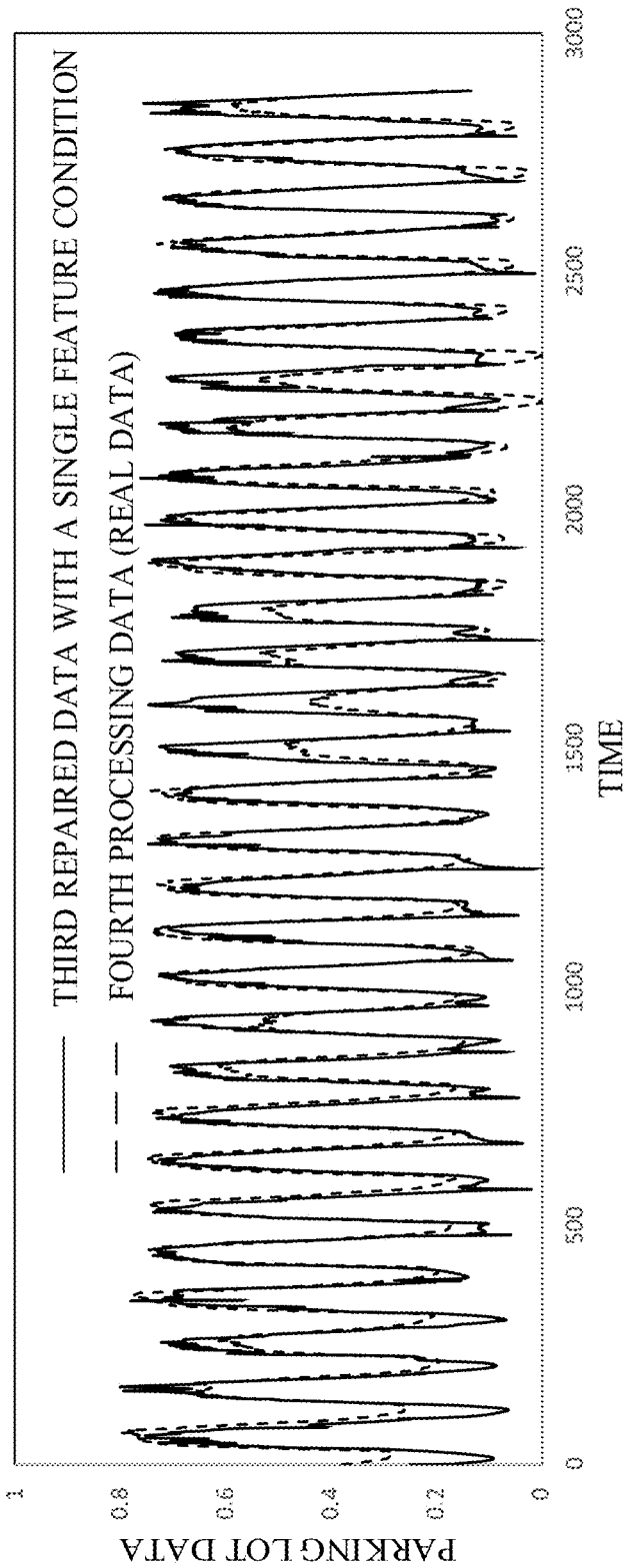
FIG. 7(b) is a comparison schematic diagram of single-condition constrained generated data with real data according to an embodiment of the application.
Figure 7C:
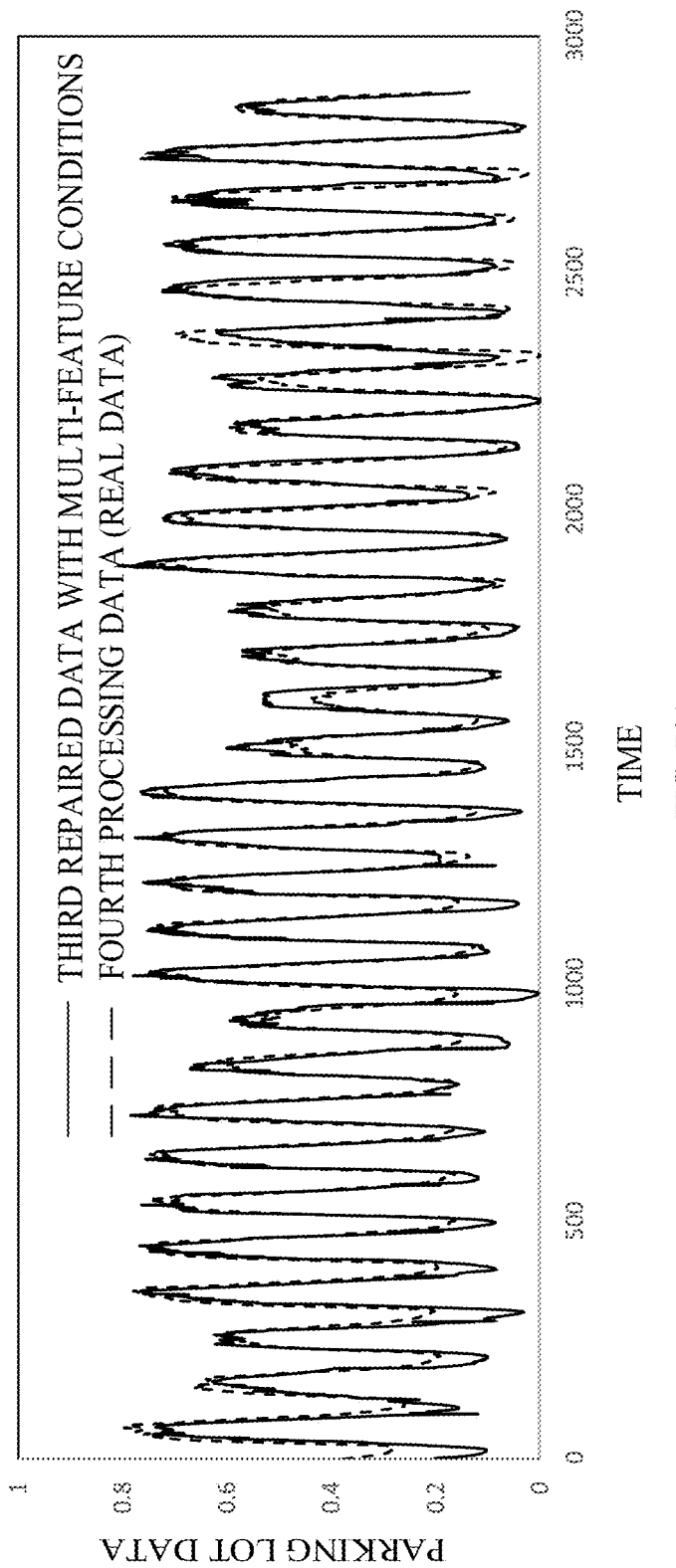
FIG. 7(c) is a comparison schematic diagram of multi-condition constrained generated data with real data according to an embodiment of the application.
Figure 8A:
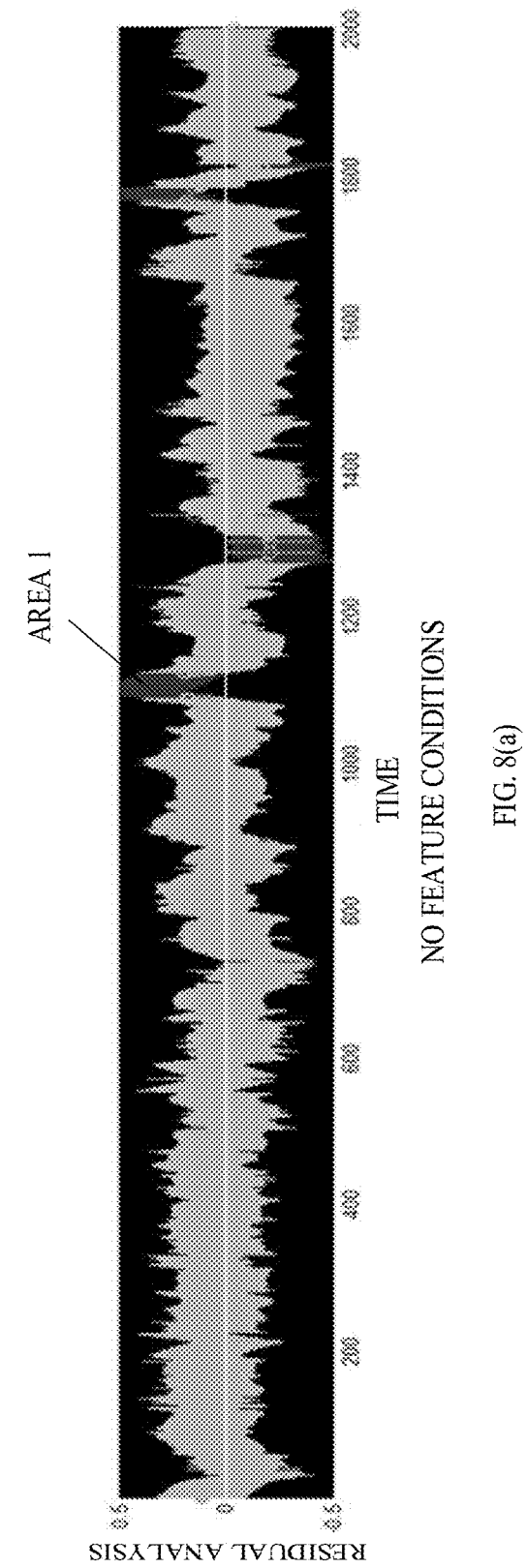
FIG. 8(a) is a schematic diagram of a condition-free constrained residual analysis result according to an embodiment of the application.
Figure 8B:
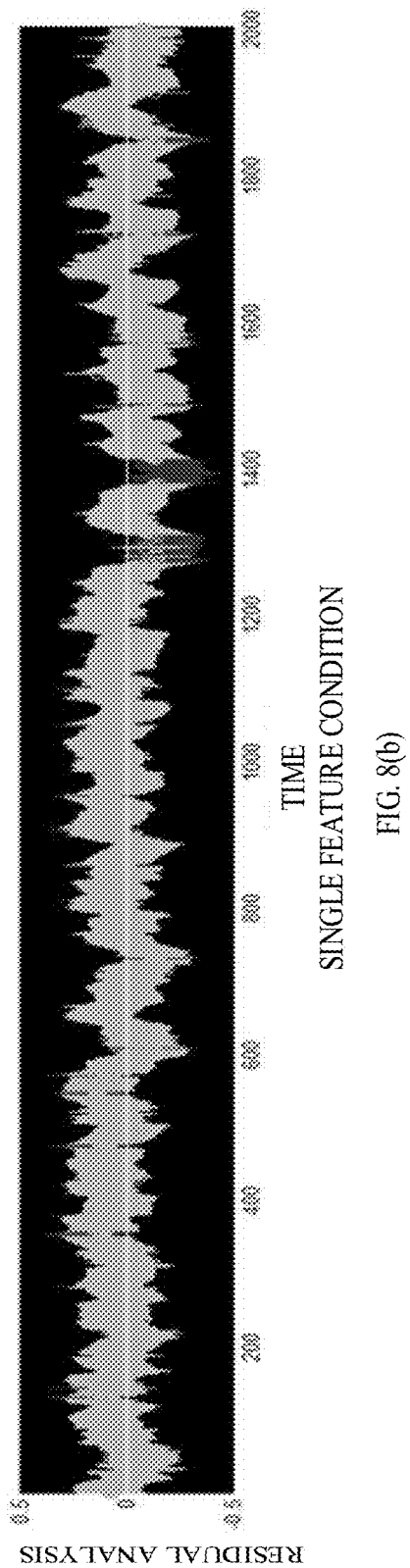
FIG. 8(b) is a schematic diagram of a single-condition constrained residual analysis result according to an embodiment of the application.
Figure 8C:
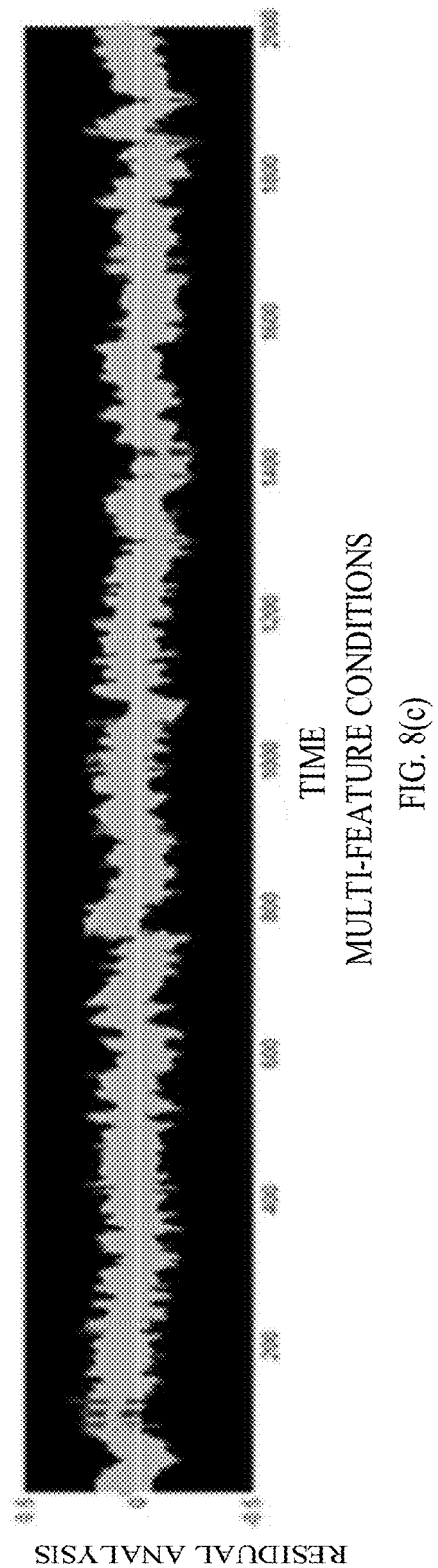
FIG. 8(c) is a schematic diagram of a multi-condition constrained residual analysis result according to an embodiment of the application.

For example, the residual analysis process may be performed based on the switching modes of different condition channels. In the implementation mode, taking three feature conditions as an example, the switching modes of the three different condition channels may be: fully closed (no feature conditions), single-channel open (a single feature condition) and multi-channel open (multi-feature conditions). Here, the regulation of the switching modes of the condition channels may be referred to the related descriptions in S307, which will not be elaborated here. In different condition channel switching modes, the comparison schematic diagram of the generated third repaired data with the real fourth processing data may be referred to FIGS. 7(a), 7(b) and 7(c). As shown in FIGS. 7(a), 7(b) and 7(c), the more feature conditions are introduced, the closer the generated third repaired data is to the fourth processing data, that is, the closer the generated repaired data is to the real sample distribution. Furthermore, residual analysis is performed on the corresponding third repaired data and the real fourth processing data in FIGS. 7(a), 7(b) and 7(c), respectively. The schematic diagrams of the residual analysis results may be referred to FIGS. 8(a), 8(b) and 8(c), respectively. Herein, a dark gray part shown in area 1 in FIG. 8(a) indicates a part which the residual analysis does not accept, that is, the obtained third repaired data deviates greatly from the real fourth processing data. As shown in FIGS. 8(a), 8(b) and 8(c), the introduction of multi-feature enables the generated third repaired data to be close to the fourth processing data, that is, the generated repaired data is closer to the real sample distribution. Therefore, when the MCGAN based on multi-condition constraints repairs the time series data, more accurate repaired data closer to the real distribution may be obtained, which improves the efficiency and quality of data repair.

At 606, the server 102 sends the residual analysis result to the client 101.

Specifically, the server 102 sends the residual analysis result to the client 101, and correspondingly, the client 101 receives the residual analysis result, so that the client 101 can show the residual analysis result to the operating user 103 of the client 101, and the operating user 103 can intuitively evaluate the quality of the generated repaired data and the training situation of the data repair model according to the residual analysis result.

It can be seen that by implementing the method described in FIG. 6, in case of acquiring the verification data and the verification condition, the server 102 performs normalization processing on the verification data to obtain the third processing data, and performs tensor processing on the verification condition to obtain the verification label. The trained data repair model is called. The third processing data is subjected to repair processing according to the verification label to obtain the third repaired data. The third repaired data is subjected to residual analysis according to the acquired real fourth processing data to obtain a residual analysis result, and the residual analysis result is sent to the client. By executing the implementation mode, the quality of the generated repaired data and the training situation of the data repair model may be evaluated more intuitively and accurately, and it may also be determined that the repaired data generated under the constraint of multi-feature conditions may be closer to the distribution situation of real samples. The introduction of the multi-feature conditions may acquire richer features of the repaired data, thus improving the efficiency and quality of data repair.

Figure 9:
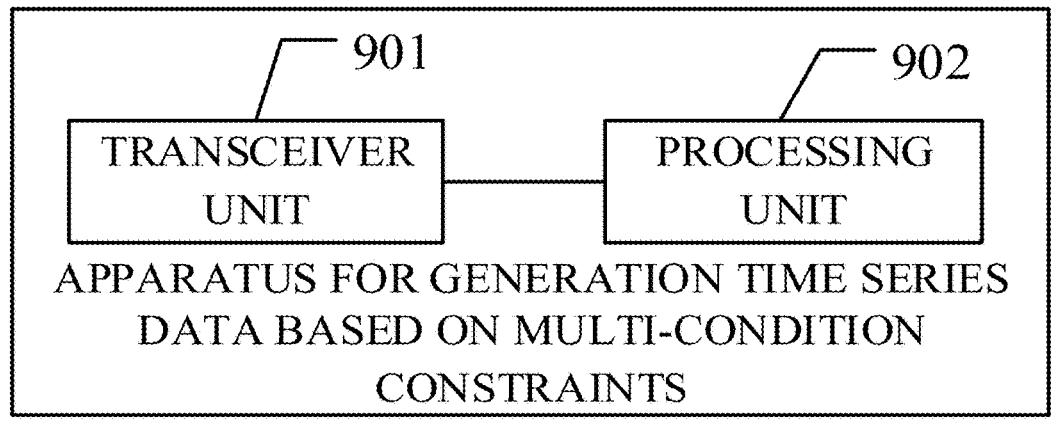
FIG. 9 is a schematic structural diagram of an apparatus for generating time series data based on multi-condition constraints according to an embodiment of the application.

Based on the descriptions of the above-mentioned method embodiments, the embodiments of the application also provide an apparatus for generating time series data based on multi-condition constraints. The apparatus for generating time series data based on multi-condition constraints may be a computer program (including a program code) running in a processing device. As shown in FIG. 9, the image visualization processing device may run the following units.

A transceiver unit 901 configured to receive a data repair request from a client, the data repair request including to-be-repaired data and condition information, the data repair request being used for requesting data repair to the to-be-repaired data according to the condition information, and the condition information being a feature condition matched with the to-be-repaired data.

A processing unit 902 configured to perform normalization processing on the to-be-repaired data to obtain normalized data of the to-be-repaired data, perform tensor processing on the condition information to obtain a feature label of the condition information, and call a trained data repair model to perform repair processing on the normalized data according to the feature label to obtain first repaired data, the data repair model being obtained by training the data repair model according to sample data, a first sample condition, real sample data and a second sample condition, and the sample data being noise data.

The transceiver unit 901 is further configured to send the first repaired data to the client.

In one implementation mode, the to-be-repaired data includes a time point sequence.

By performing repair processing on the normalized data according to the feature label to obtain the first repaired data, the processing unit 902 may further be configured to sort each data in the normalized data according to the time point sequence. The time point sequence is a sequence composed of generation time points of each data in the to-be-repaired data, and each data in the normalized data is obtained by performing normalization processing on each data in the to-be-repaired data.

According to the feature label, data repair processing is performed on the sorted normalized data to obtain the first repaired data.

In another implementation mode, before calling the trained data repair model, the processing unit 902 may further be configured to acquire the sample data and the first sample condition, perform normalization processing on the sample data to obtain first processing data of the sample data, and perform tensor processing on the first sample condition to obtain a first sample label.

The real sample data and the second sample condition are acquired, normalization processing being performed on the real sample data to obtain second processing data of the real sample data, and tensor processing being performed on the second sample condition to obtain a second sample label.

Supervision training is performed on the data repair model according to the first processing data, the first sample label, the second processing data and the second sample label, to determine a model function.

Network parameters are optimized according to the model function, to construct the data repair model.

In yet another implementation mode, the first sample condition includes n feature conditions, and n is a positive integer.

Before acquiring the sample data and the first sample condition, the processing unit 902 may further be configured to receive a condition instruction sent by the client, the condition instruction being used to indicate that x feature conditions are acquired from the n feature conditions, x being a non-negative integer less than or equal to n.

The x feature conditions are acquired from the first sample condition information including the n feature conditions according to the condition instruction.

In still another implementation mode, the model function includes a generative loss function, a discrimination loss function and an objective function.

By performing supervision training on the data repair model according to the first processing data, the first sample label, the second processing data and the second sample label, to determine the model function, the processing unit 902 may further be configured to perform repair processing on the first processing data according to the first sample label to obtain second repaired data, and perform discrimination processing on the second repaired data and the first sample label to obtain a first discrimination result.

Discrimination processing is performed on the second processing data and the second sample label to obtain a second discrimination result.

The discrimination loss function is determined according to the first discrimination result and the second discrimination result, and the discrimination loss function is the loss function of the discriminator.

According to the first discrimination result, the generative loss function is determined, and the generative loss function is the loss function of the generator.

The discrimination loss function and the generative loss function are optimized to determine the objective function.

In yet another implementation mode, the processing unit 902 may further be configured to perform an average cosine similarity calculation on the second repaired data and the second processing data to obtain a similarity result, the second processing data being real data matched with the second repaired data.

The network parameters of the data repair model are optimized according to the similarity result.

In yet another implementation mode, the sample data includes verification data, and the processing unit 902 may further be configured to acquire the verification data and perform normalization processing on the verification data to obtain third processing data of the verification data.

A verification condition is acquired and tensor processing is performed on the verification condition to obtain a verification label of the verification condition.

The trained data repair model is called, and repair processing is performed on the third processing data according to the verification label to obtain third repaired data.

Real verification data is acquired, and normalization processing is performed on the real verification data to obtain fourth processing data of the real verification data. The fourth processing data is real data matched with the third repaired data.

Residual analysis is performed on the third repaired data and the fourth processing data to obtain a residual analysis result.

The transceiver unit 901 may further be configured to send the residual analysis result to the client.

According to an embodiment of the present application, part of the steps involved in the methods for generating time series data based on multi-condition constraints shown in FIG. 2, FIG. 3, and FIG. 6 may be executed by a processing unit in the apparatus for generating time series data based on multi-condition constraints. For example, S201 and S205 shown in FIG. 2 may be executed by the transceiver unit 901. For another example, S203 shown in FIG. 2 may be executed by the processing unit 902. According to another embodiment of the present application, the units in the apparatus for generating time series data based on multi-condition constraints may be separately or all combined into one or multiple other units to form, or a certain unit or some units therein may also be divided into multiple functionally smaller units to form, which may achieve the same operation without affecting the implementation of the technical effects of the embodiments of the present application.

Figure 10:
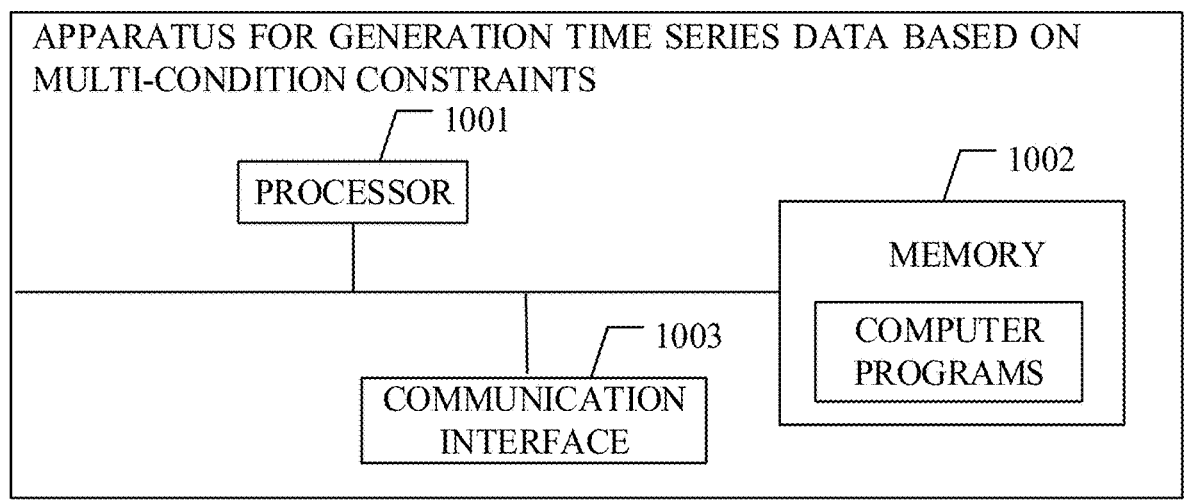
FIG. 10 is a schematic structural diagram of another apparatus for generating time series data based on multi-condition constraints according to an embodiment of the application.

Referring to FIG. 10, which is a schematic structural diagram of an apparatus for generating time series data based on multi-condition constraints according to an embodiment of the present application. The data generation apparatus includes a processor 1001, a memory 1002, and a communication interface 1003. The processor 1001, the memory 1002 and the communication interface 1003 are connected by at least one communication bus, and the processor 1001 is configured to support the processing device to execute the corresponding functions of the processing device in the methods of FIG. 2, FIG. 3, and FIG. 6.

The memory 1002 is configured to store at least one instruction suitable for being loaded and executed by a processor, and these instructions may be one or more computer programs (including a program code).

The communication interface 1003 is configured to receive data and send data. For example, the communication interface 1003 is configured to send a data repair request and the like.

In the embodiment of the present application, the processor 1001 may call the program code stored in the memory 1002 to execute the following operations.

The data repair request from the client is received through the communication interface 1003. The data repair request includes to-be-repaired data and condition information. The data repair request is used for requesting data repair to the to-be-repaired data according to the condition information and the condition information is a feature condition that matches the to-be-repaired data.

Normalization processing is performed on the to-be-repaired data to obtain normalized data of the to-be-repaired data, and tensor processing is performed on the condition information to obtain a feature label of the condition information.

A trained data repair model is called to perform repair processing on the normalized data according to the feature label to obtain first repaired data. The data repair model is obtained by training the data repair model according to sample data, a first sample condition, real sample data and a second sample condition, and the sample data is noise data. The first repaired data is sent to the client through the communication interface 1003.

As an optional implementation mode, the to-be-repaired data includes a time point sequence.

According to the feature label, repair processing is performed on the normalized data to obtain the first repaired data. The processor 1001 may call the program code stored in the memory 1002 to execute the following operations.

Each data in the normalized data is sorted according to the time point sequence, the time point sequence being a sequence composed of generation time points of each data in the to-be-repaired data, and each data in the normalized data being obtained by performing normalization processing on each data in the to-be-repaired data.

According to the feature label, data repair processing is performed on the sorted normalized data to obtain the first repaired data.

As an optional implementation mode, before calling the trained data repair model, the processor 1001 may call the program code stored in the memory 1002 to execute the following operations.

The sample data and the first sample condition are acquired, normalization processing being performed on the sample data to obtain first processing data of the sample data, and tensor processing being performed on the first sample condition to obtain a first sample label.

The real sample data and the second sample condition are acquired, normalization processing being performed on the real sample data to obtain second processing data of the real sample data, and tensor processing being performed on the second sample condition to obtain a second sample label.

Supervision training is performed on the data repair model according to the first processing data, the first sample label, the second processing data and the second sample label, to determine a model function.

Network parameters are optimized according to the model function, to construct the data repair model.

As an optional implementation mode, the first sample condition includes n feature conditions, and n is a positive integer.

Before acquiring the sample data and the first sample condition, the processor 1001 may call the program code stored in the memory 1002 to execute the following operations.

A condition instruction sent by the client is received, the condition instruction being used to indicate that x feature conditions are acquired from the n feature conditions, x being a non-negative integer less than or equal to n.

The x feature conditions are acquired from the first sample condition information including the n feature conditions according to the condition instruction.

As an optional implementation mode, the model function includes a generative loss function, a discrimination loss function and an objective function.

Supervision training is performed on the data repair model according to the first processing data, the first sample label, the second processing data and the second sample label, to determine the model function. The processor 1001 may call the program code stored in the memory 1002 to execute the following operations.

Repair processing is performed on the first processing data according to the first sample label to obtain second repaired data, and discrimination processing is performed on the second repaired data and the first sample label to obtain a first discrimination result.

Discrimination processing is performed on the second processing data and the second sample label to obtain a second discrimination result.

The discrimination loss function is determined according to the first discrimination result and the second discrimination result, and the discrimination loss function is the loss function of the discriminator.

According to the first discrimination result, the generative loss function is determined, and the generative loss function is the loss function of the generator.

The discrimination loss function and the generative loss function are optimized to determine the objective function.

As an optional implementation mode, the processor 1001 may call the program code stored in the memory 1002 to execute the following operations.

An average cosine similarity calculation is performed on the second repaired data and the second processing data to obtain a similarity result, the second processing data being real data matched with the second repaired data.

The network parameters of the data repair model are optimized according to the similarity result.

As an optional implementation mode, the sample data includes verification data, and the processor 1001 may call the program code stored in the memory 1002 to execute the following operations.

The verification data is acquired and normalization processing is performed on the verification data to obtain third processing data of the verification data.

A verification condition is acquired and tensor processing is performed on the verification condition to obtain a verification label of the verification condition.

The trained data repair model is called, and repair processing is performed on the third processing data according to the verification label to obtain third repaired data.

Real verification data is acquired, and normalization processing is performed on the real verification data to obtain fourth processing data of the real verification data. The fourth processing data is real data matched with the third repaired data.

Residual analysis is performed on the third repaired data and the fourth processing data to obtain a residual analysis result, and the residual analysis result is sent to the client through the communication interface 1003.

The embodiments of the present application further provide a computer-readable storage medium (memory), which may be configured to store a computer software instruction applied to a processing device in embodiments shown in FIG. 2 and FIG. 3. The storage space further stores at least one instruction suitable for being loaded and executed by a processor, and these instructions may be one or more computer programs (including a program code).

The above-mentioned computer-readable storage medium includes, but is not limited to, a flash memory, a hard disk, and a solid-state hard disk.

Those of ordinary skill in the art may realize that the units and algorithm steps of each example described in combination with the embodiments disclosed in the application can be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the application.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the application are completely or partially generated. The computer may be a universal computer, a dedicated computer, a computer network, or another programmable device. The computer instruction may be stored in a computer-readable storage medium or transmitted through the computer-readable storage medium. The computer instruction may be transmitted from one website, computer, server or data center to another website, computer, server or data center in a wired (for example, a coaxial cable, an optical fiber and a Digital Subscriber Line (DSL)) or wireless (for example, infrared, radio and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Versatile Disc (DVD)), a semiconductor medium (for example, a Solid State Disk (SSD)) or the like.

The specific implementation modes described above further elaborate the purpose, technical solutions, and beneficial effects of the application. It is to be understood that the above is only specific implementation modes of the application, and is not intended to limit the scope of protection of the application. Any modification, equivalent replacement, improvement, etc. made on the basis of the technical solutions of the application shall fall within the scope of protection of the application.

What is claimed is:

1. A method for generating time series data based on multi-condition constraints, comprising:
   receiving a data repair request from a client, the data repair request comprising to-be-repaired data and condition information, the data repair request being configured to request data repair to the to-be-repaired data according to the condition information, and the condition information being a feature condition matched with the to-be-repaired data;
   performing normalization processing on the to-be-repaired data to obtain normalized data of the to-be-repaired data, and performing tensor processing on the condition information to obtain a feature label of the condition information;
   calling a trained data repair model to perform repair processing on the normalized data according to the feature label to obtain first repaired data, the data repair model being obtained by training the data repair model according to sample data, a first sample condition, real sample data and a second sample condition, and the sample data being noise data; and
   sending the first repaired data to the client.

2. The method of claim 1, wherein the to-be-repaired data comprises a time point sequence,
   wherein performing, according to the feature label, repair processing on the normalized data to obtain the first repaired data comprises:
   sorting each data in the normalized data according to the time point sequence, the time point sequence being a sequence composed of generation time points of each data in the to-be-repaired data, and each data in the normalized data being obtained by performing normalization processing on each data in the to-be-repaired data; and
   performing, according to the feature label, data repair processing on the sorted normalized data to obtain the first repaired data.

3. The method of claim 1, before calling the trained data repair model, further comprising:
   acquiring the sample data and the first sample condition, performing normalization processing on the sample data to obtain first processing data of the sample data, and performing tensor processing on the first sample condition to obtain a first sample label;
   acquiring the real sample data and the second sample condition, performing normalization processing on the real sample data to obtain second processing data of the real sample data, and performing tensor processing on the second sample condition to obtain a second sample label;
   performing supervision training on the data repair model according to the first processing data, the first sample label, the second processing data and the second sample label, to determine a model function; and
   optimizing network parameters according to the model function, to construct the data repair model.

4. The method of claim 3, wherein the first sample condition comprises n feature conditions, and n is a positive integer,
   wherein before acquiring the sample data and the first sample condition, the method further comprises:
   receiving a condition instruction sent by the client, the condition instruction being configured to indicate that x feature conditions are acquired from the n feature conditions, x being a non-negative integer less than or equal to n; and acquiring the x feature conditions from the first sample condition information including the n feature conditions according to the condition instruction.

5. The method of claim 3, wherein the model function comprises a generative loss function, a discrimination loss function and an objective function, wherein performing supervision training on the data repair model according to the first processing data, the first sample label, the second processing data and the second sample label, to determine the model function comprises:

performing repair processing on the first processing data according to the first sample label to obtain second repaired data, and performing discrimination processing on the second repaired data and the first sample label to obtain a first discrimination result;

performing discrimination processing on the second processing data and the second sample label to obtain a second discrimination result;

determining the discrimination loss function according to the first discrimination result and the second discrimination result, the discrimination loss function being the loss function of the discriminator;

determining, according to the first discrimination result, the generative loss function, the generative loss function being the loss function of the generator; and optimizing the discrimination loss function and the generative loss function to determine the objective function.

6. The method of claim 5, further comprising:
performing an average cosine similarity calculation on the second repaired data and the second processing data to obtain a similarity result, the second processing data being real data matched with the second repaired data; and optimizing the network parameters of the data repair model according to the similarity result.

7. The method of claim 3, wherein the sample data comprises verification data, wherein the method further comprises:

acquiring the verification data, and performing normalization processing on the verification data to obtain third processing data of the verification data;

acquiring verification condition and performing tensor processing on the verification condition to obtain a verification label of the verification condition;

calling the trained data repair model, and performing repair processing on the third processing data according to the verification label to obtain third repaired data;

acquiring real verification data, and performing normalization processing on the real verification data to obtain fourth processing data of the real verification data, the fourth processing data being real data matched with the third repaired data; and performing residual analysis on the third repaired data and the fourth processing data to obtain a residual analysis result, and sending the residual analysis result to the client.

8. An apparatus for generating time series data based on multi-condition constraints, comprising:

a transceiver unit, configured to receive a data repair request from a client, the data repair request comprising to-be-repaired data and condition information, the data repair request being configured to request data repair to the to-be-repaired data according to the condition information, and the condition information being a feature condition matched with the to-be-repaired data; and a processing unit, configured to perform normalization processing on the to-be-repaired data to obtain normalized data of the to-be-repaired data, perform tensor processing on the condition information to obtain a feature label of the condition information, and call a trained data repair model to perform repair processing on the normalized data according to the feature label to obtain first repaired data, the data repair model being obtained by training the data repair model according to sample data, a first sample condition, real sample data and a second sample condition, and the sample data being noise data, wherein the transceiver unit is further configured to send the first repaired data to the client.

9. The apparatus of claim 8, wherein the to-be-repaired data comprises a time point sequence, the processing unit configured to call the trained data repair model to perform repair processing on the normalized data according to the feature label to obtain the first repaired data is configured to:

sort each data in the normalized data according to the time point sequence, the time point sequence being a sequence composed of generation time points of each data in the to-be-repaired data, and each data in the normalized data being obtained by performing normalization processing on each data in the to-be-repaired data; and perform, according to the feature label, data repair processing on the sorted normalized data to obtain the first repaired data.

10. The apparatus of claim 8, wherein the processing unit is further configured to:

before calling the trained data repair model, acquire the sample data and the first sample condition, perform normalization processing on the sample data to obtain first processing data of the sample data, and perform tensor processing on the first sample condition to obtain a first sample label;

acquire the real sample data and the second sample condition, perform normalization processing on the real sample data to obtain second processing data of the real sample data, and perform tensor processing on the second sample condition to obtain a second sample label;

perform supervision training on the data repair model according to the first processing data, the first sample label, the second processing data and the second sample label, to determine a model function; and optimize network parameters according to the model function, to construct the data repair model.

11. The apparatus of claim 10, wherein the first sample condition comprises n feature conditions, and n is a positive integer, wherein the transceiver unit is further configured to:

receive a condition instruction sent by the client before acquiring the sample data and the first sample condition, the condition instruction being configured to indicate that x feature conditions are acquired from the n feature conditions, x being a non-negative integer less than or equal to n; and acquire the x feature conditions from the first sample condition information including the n feature conditions according to the condition instruction.

12. The apparatus of claim 10, wherein the model function comprises a generative loss function, a discrimination loss function and an objective function, wherein the processing unit configured to perform supervision training on the data repair model according to the first processing data, the first sample label, the second processing data and the second sample label, to determine the model function is configured to:
perform repair processing on the first processing data according to the first sample label to obtain second repaired data, and perform discrimination processing on the second repaired data and the first sample label to obtain a first discrimination result;
perform discrimination processing on the second processing data and the second sample label to obtain a second discrimination result;
determine the discrimination loss function according to the first discrimination result and the second discrimination result, the discrimination loss function being the loss function of the discriminator;
determine, according to the first discrimination result, the generative loss function, the generative loss function being the loss function of the generator; and
optimize the discrimination loss function and the generative loss function to determine the objective function.

13. The apparatus of claim 12, wherein the processing unit is further configured to:
perform an average cosine similarity calculation on the second repaired data and the second processing data to obtain a similarity result, the second processing data being real data matched with the second repaired data; and
optimize the network parameters of the data repair model according to the similarity result.

14. The apparatus of claim 10, wherein the sample data comprises verification data, the processing unit is further configured to:
acquire the verification data, and performing normalization processing on the verification data to obtain third processing data of the verification data;
acquire verification condition and performing tensor processing on the verification condition to obtain a verification label of the verification condition;
call the trained data repair model, and perform repair processing on the third processing data according to the verification label to obtain third repaired data;
acquire real verification data, and perform normalization processing on the real verification data to obtain fourth processing data of the real verification data, the fourth processing data being real data matched with the third repaired data; and
perform residual analysis on the third repaired data and the fourth processing data to obtain a residual analysis result, and send the residual analysis result to the client.

15. An apparatus for generating time series data based on multi-condition constraints, comprising a processor, a memory and a communication interface, wherein the processor, the memory and the communication interface are interconnected, the memory being configured to store a computer program, the computer program including a program instruction, and the processor being configured to call the program instruction to:
receive a data repair request from a client, the data repair request comprising to-be-repaired data and condition information, the data repair request being configured to request data repair to the to-be-repaired data according to the condition information, and the condition information being a feature condition matched with the to-be-repaired data;
perform normalization processing on the to-be-repaired data to obtain normalized data of the to-be-repaired data, and perform tensor processing on the condition information to obtain a feature label of the condition information;
call a trained data repair model to perform repair processing on the normalized data according to the feature label to obtain first repaired data, the data repair model being obtained by training the data repair model according to sample data, a first sample condition, real sample data and a second sample condition, and the sample data being noise data; and
send the first repaired data to the client.

16. The apparatus of claim 15, wherein the to-be-repaired data comprises a time point sequence,
the processor configured to perform, according to the feature label, repair processing on the normalized data to obtain the first repaired data is configured to:
sort each data in the normalized data according to the time point sequence, the time point sequence being a sequence composed of generation time points of each data in the to-be-repaired data, and each data in the normalized data being obtained by performing normalization processing on each data in the to-be-repaired data; and
perform, according to the feature label, data repair processing on the sorted normalized data to obtain the first repaired data.

17. The apparatus of claim 15, wherein the processor is further configured to:
before calling the trained data repair model, acquire the sample data and the first sample condition, perform normalization processing on the sample data to obtain first processing data of the sample data, and perform tensor processing on the first sample condition to obtain a first sample label;
acquire the real sample data and the second sample condition, perform normalization processing on the real sample data to obtain second processing data of the real sample data, and perform tensor processing on the second sample condition to obtain a second sample label;
perform supervision training on the data repair model according to the first processing data, the first sample label, the second processing data and the second sample label, to determine a model function; and
optimize network parameters according to the model function, to construct the data repair model.

18. The apparatus of claim 17, wherein the first sample condition comprises n feature conditions, and n is a positive integer, the processor is further configured to:
before acquiring the sample data and the first sample condition, receive a condition instruction sent by the client, the condition instruction being configured to indicate that x feature conditions are acquired from the n feature conditions, x being a non-negative integer less than or equal to n; and
acquire the x feature conditions from the first sample condition information including the n feature conditions according to the condition instruction.

19. The apparatus of claim 17, wherein the model function comprises a generative loss function, a discrimination loss function and an objective function, the processor configured to perform supervision training on the data repair model according to the first processing data, the first sample label, the second processing data and the second sample label, to determine the model function is configured to:
perform repair processing on the first processing data according to the first sample label to obtain second repaired data, and perform discrimination processing on the second repaired data and the first sample label to obtain a first discrimination result;

perform discrimination processing on the second processing data and the second sample label to obtain a second discrimination result;

determine the discrimination loss function according to the first discrimination result and the second discrimination result, the discrimination loss function being the loss function of the discriminator;

determine, according to the first discrimination result, the generative loss function, the generative loss function being the loss function of the generator; and optimize the discrimination loss function and the generative loss function to determine the objective function.

20. The apparatus of claim 19, wherein the processor is further configured to:

perform an average cosine similarity calculation on the second repaired data and the second processing data to obtain a similarity result, the second processing data being real data matched with the second repaired data; and optimize the network parameters of the data repair model according to the similarity result.

* * * * *